(12) United States Patent
Axmon et al.

(10) Patent No.: US 10,652,068 B2
(45) Date of Patent: May 12, 2020

(54) SYNCHRONIZATION SIGNAL DETECTION

(71) Applicant: Telefonaktiebolaget LM Ericsson (publ), Stockholm (SE)

(72) Inventors: Joakim Axmon, Limhamn (SE); Dandan Hao, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 113 days.

(21) Appl. No.: 15/781,582

(22) PCT Filed: Dec. 22, 2016

(86) PCT No.: PCT/EP2016/082313
§ 371 (c)(1),
(2) Date: Jun. 5, 2018

(87) PCT Pub. No.: WO2017/121603
PCT Pub. Date: Jul. 20, 2017

(65) Prior Publication Data
US 2020/0099566 A1 Mar. 26, 2020

(30) Foreign Application Priority Data
Jan. 12, 2016 (WO) ................ PCT/CN2016/070698

(51) Int. Cl.
*H04L 5/00* (2006.01)
*H04L 27/26* (2006.01)
*H04L 29/08* (2006.01)

(52) U.S. Cl.
CPC .......... *H04L 27/2663* (2013.01); *H04L 5/005* (2013.01); *H04L 67/12* (2013.01)

(58) Field of Classification Search
CPC . H04L 27/2655; H04L 5/0094; H04L 5/0012; H04L 27/2665; H04L 27/2656;
(Continued)

(56) References Cited

U.S. PATENT DOCUMENTS 7,957,259 B1    6/2011  Fang et al.
2009/0067515 A1 3/2009  Galperin et al.
(Continued)

FOREIGN PATENT DOCUMENTS

WO    2017014600 A1    1/2017

OTHER PUBLICATIONS

Kim, Ilgyu et al., "Sequence Hopping Cell Search Scheme for OFDM Cellular Systems", IEEE Transactions on Wireless Communications, vol. 7, No. 5, May 2008, pp. 1483-1489.
(Continued)

*Primary Examiner* — Rahel Guarino
(74) *Attorney, Agent, or Firm* — Murphy, Bilak & Homiller, PLLC

(57) ABSTRACT

Detection of Narrow-Band IOT (NB-IOT) Synchronization signal and Cyclic Prefix length determination at UE. The detection method implements symbol level correlation, comprising: filtering the radio signal with a plurality of matched filters to obtain a correlation for each OFDM symbol in the synchronization signal, wherein each matched filter provides a correlation with one OFDM symbol in the synchronization signal; delaying and combining the outputs of the plurality of matched filters in a first way to provide a first combined output for the normal cyclic prefix configuration and delaying and combining the outputs of the plurality of matched filters in a second way to provide a second combined output for the extended cyclic prefix configuration; and detecting a correlation peak indicative of the synchronization signal in one of the first or second combined outputs. The present disclosure also relates to a user equipment including the apparatus.

26 Claims, 16 Drawing Sheets

(58) Field of Classification Search
CPC ....... H04L 27/266; H04L 5/005; H04L 67/12; H04L 27/2663; H04W 72/0446; H04W 56/001; Y02D 70/1262; Y02D 70/126; Y02D 70/1264; Y02D 70/20; Y02D 70/10
See application file for complete search history.

(56) References Cited

U.S. PATENT DOCUMENTS

| | | |
|---|---|---|
| 2009/0074100 A1 | 3/2009 | Bae |
| 2009/0245413 A1 | 10/2009 | Miyoshi et al. |
| 2009/0323642 A1 | 12/2009 | Tanno et al. |
| 2011/0013732 A1 | 1/2011 | Atungsiri |
| 2018/0294910 A1* | 10/2018 | Kim .................... H04J 11/0076 |

OTHER PUBLICATIONS

"General considerations on NB-IOT DL physical layer design", 3GPP TSG RAN WG1 Meeting #83; R1-156972; Anaheim, USA, Nov. 15-22, 2015, pp. 1-5.

"NB-PSS and NB.SSS design for NB-IoT", 3GPP TSG RAN WG1 NB-IoT Ad.Hoc Meeting; R1160049; Budapest, Hungary, Jan. 18-20, 2016, pp. 1-10.

Zhi, Yan et al., "A Novel Initial Cell Search Scheme in TD-LTE", Vehicular Technology.Conference (VTC Spring); IEEE 73rd, May 15, 2011, pp. 1-5.

* cited by examiner

SYNCHRONIZATION SIGNAL DETECTION

TECHNICAL FIELD

The disclosure generally relates to communication system, and more particularly, to a method and apparatus for detecting a synchronization signal including a number of OFDM symbols included in a sequence of OFDM symbols in a received radio signal.

BACKGROUND

Synchronization signal detection is important for cell search in mobile communication. Generally, a synchronization signal such as Primary Synchronization Signal (PPS) or Primary Synchronization Signal (SSS) is carried by OFDM symbols in a radio signal. In Long Term Evolution (LTE) system, a synchronization signal is transmitted in 6 subframes and occupies one OFDM symbol in each subframe. A traditional approach of detecting such synchronization signal is to filter the radio signal using a matched filter that spans the whole time duration spanned by a synchronization signal to determine if a synchronization signal exists.

Internet-of-Things (IoT) is the vision of virtually all objects being connected to the internet, where the objects can be anything from simple sensors to sophisticated machinery such as vehicles. The Third Generation Partnership Project (3GPP) is currently specifying a new kind of radio access technology (RAT) with strong commonalities with LTE but operating over a narrower bandwidth. The new RAT is referred to as Narrow-Band IoT (NB-IoT).

In NB-IoT system, different cyclic prefix configurations of OFDM symbols such as Normal Cyclic Prefix (NCP) and Extended Cyclic Prefix (ECP) configurations are employed. Synchronization signal is designed special for NB-IoT system, which is different from that for normal LTE system.

There is no solution in the art to detect such synchronization signal. If detect it in the same fashion as for regular LTE, such as by using a matched filter that spans the whole time duration spanned by the synchronization signal, there will be a need to perform two kinds of matched filtering operations—one for NCP configuration and one for ECP configuration, because the synchronization signal is spread out on multiple OFDM symbols at different distances depending on cyclic prefix configuration.

It is desirable to provide an efficient solution to detect such synchronization signal.

SUMMARY

According to the present disclosure, a method, apparatus, and user equipment is proposed to solve or relieve at least one of the above problems or disadvantages.

Instead of using a matched filter that spans the whole time duration spanned by the synchronization signal, the present disclosure propose to use several small matched filters to detect a synchronization signal, where each filter corresponds to one OFDM symbol out of the multiple OFDM symbols carrying the synchronization signal. Accordingly, an efficient solution is provided to detect a synchronization signal including a number of OFDM symbols included in a sequence of OFDM symbols which may have different cyclic prefix configurations, without the need of performing different matched filtering operations for different cyclic prefix configurations separately.

In a first aspect of the present disclosure, there is provided a method of detecting a synchronization signal including a number of OFDM symbols included in a sequence of OFDM symbols in a received radio signal wherein the OFDM symbols have a first cyclic prefix configuration or a second cyclic prefix configuration, the method including: filtering the radio signal with a plurality of matched filters to obtain correlations for OFDM symbols which may be used in the synchronization signal, wherein each matched filter provides a correlation with one OFDM symbol which may be used in the synchronization signal; delaying and combining the outputs of the plurality of matched filters in a first way to provide a first combined output for the first cyclic prefix configuration and delaying and combining the outputs of the plurality of matched filters in a second way to provide a second combined output for the second cyclic prefix configuration; and detecting a correlation peak indicative of the synchronization signal in one of the first or second combined outputs.

In an example, each of the plurality of matched filters may have the same length as one OFDM symbol.

In another example, each of the plurality of matched filters may have a length larger than one OFDM symbol but less than or equal to one OFDM symbol plus one cyclic prefix for the cyclic prefix configuration having the shorter cyclic prefixes of the first and second cyclic prefix configurations.

In an example, said delaying and combining may include: delaying the outputs of the plurality of matched filters using a plurality of delay lines; and combining, using a combiner, the outputs of the plurality of delay lines to provide a first combined output for the first cyclic prefix configuration and a second combined output for the second cyclic prefix configuration, wherein each delay line is configured with first and second delay factors, which are calculated based on a mapping between a distribution of the synchronization signal in a subframe of the first cyclic prefix configuration and a distribution of the synchronization signal in a subframe of the second cyclic prefix configuration, to provide a first delayed output for the first cyclic prefix configuration and a second delayed output for the second cyclic prefix configuration respectively.

In another example, said delaying and combining may include delaying and combining, using a plurality of delay lines and a plurality of combiners arranged into stages, the outputs of the plurality of matched filters hierarchically to provide a first combined output for the first cyclic prefix configuration and a second combined output for the second cyclic prefix configuration, wherein each delay line is configured with first and second delay factors, which are calculated based on a mapping between a distribution of the synchronization signal in a subframe of the first cyclic prefix configuration and a distribution of the synchronization signal in a subframe of the second cyclic prefix configuration to provide a first delayed output for the first cyclic prefix configuration and a second delayed output for the second cyclic prefix configuration respectively.

In an example, the plurality of matched filters may be frequency compensated matched filters derived for a frequency offset hypothesis, and the method may further include modifying the phases of the outputs of the plurality of matched filters by using one or more phase factors associated with the frequency offset hypothesis to implement a continuous phase at the first and second combined outputs.

In an example, the first cyclic prefix configuration may be a normal cyclic prefix (NCP) configuration and the second cyclic prefix configuration may be an extended cyclic prefix (ECP) configuration, and the synchronization signal may be a Narrow-Band Primary Synchronization Signal (NB-PSS).

In another example, the first cyclic prefix configuration may be a normal cyclic prefix (NCP) configuration and the second cyclic prefix configuration may be an extended cyclic prefix (ECP) configuration, and the synchronization signal may be a Narrow-Band Secondary Synchronization Signal (NB-SSS).

In an example, at least some of the OFDM symbols carrying the synchronization signal in a subframe for NCP configuration may be used for carrying the synchronization signal in a subframe for ECP configuration.

In another example, in the subframe for NCP configuration, the synchronization signal may be carried by the same OFDM symbols as in the subframe for ECP configuration.

In yet another example, in the subframe for NCP configuration, the synchronization signal may be carried by the OFDM symbols in the same order as in the subframe for ECP configuration.

In an example, one or more of the OFDM symbols carrying the synchronization signal in the subframe of NCP configuration may be manipulated by negation or conjugation when being used to carry the synchronization signal in the subframe of ECP configuration.

In an example, the input to each of the plurality of matched filters may be provided at the same time.

In another example, the input to each of the plurality of matched filters may be individually delayed.

In an example, the method may further include identifying which cyclic prefix configuration is being used for the received radio signal.

In a second aspect of the present disclosure, there is provided an apparatus for detecting a synchronization signal including a number of OFDM symbols included in a sequence of OFDM symbols in a received radio signal wherein the OFDM symbols have a first cyclic prefix configuration or a second cyclic prefix configuration, the apparatus including: a plurality of matched filters configured to filter the radio signal to obtain correlations for OFDM symbols which may be used in the synchronization signal, wherein each matched filter provides a correlation with one OFDM symbol which may be used in the synchronization signal; and a delaying and combining unit configured to delay and combine the outputs of the plurality of matched filters in a first way to provide a first combined output for the first cyclic prefix configuration and delay and combine the outputs of the plurality of matched filters in a second way to provide a second combined output for the second cyclic prefix configuration; and a peak detector configured to detect a correlation peak indicative of the synchronization signal in one of the first or second combined outputs.

In an example, each of the plurality of matched filters may have the same length as one OFDM symbol.

In another example, each of the plurality of matched filters may have a length larger than one OFDM symbol but less than or equal to one OFDM symbol plus one cyclic prefix for the cyclic prefix configuration having the shorter cyclic prefixes of the first and second cyclic prefix configurations.

In an example, said delaying and combining unit may include: a plurality of delay lines configured to delay the outputs of the plurality of matched filters; and a combiner configured to combine the outputs of the plurality of delay lines to provide a first combined output for the first cyclic prefix configuration and a second combined output for the second cyclic prefix configuration, wherein each delay line is configured with first and second delay factors, which are calculated based on a mapping between a distribution of the synchronization signal in a subframe of the first cyclic prefix configuration and a distribution of the synchronization signal in a subframe of the second cyclic prefix configuration, to provide a first delayed output for the first cyclic prefix configuration and a second delayed output for the second cyclic prefix configuration respectively.

In another example, said delaying and combining unit may include a plurality of delay lines and a plurality of combiners arranged into stages and configured to delay and combine the outputs of the plurality of matched filters hierarchically to provide a first combined output for the first cyclic prefix configuration and a second combined output for the second cyclic prefix configuration, wherein each delay line is configured with first and second delay factors, which are calculated based on a mapping between a distribution of the synchronization signal in a subframe of the first cyclic prefix configuration and a distribution of the synchronization signal in a subframe of the second cyclic prefix configuration, to provide a first delayed output for the first cyclic prefix configuration and a second delayed output for the second cyclic prefix configuration respectively.

In an example, the plurality of matched filters may be frequency compensated matched filters derived for a frequency offset hypothesis, and the delaying and combining unit may be further configured to modify the phases of the outputs of the plurality of matched filters by using one or more phase factors associated with the frequency offset hypothesis to implement a continuous phase at the first and second combined outputs.

In an example, the first cyclic prefix configuration may be a normal cyclic prefix (NCP) configuration and the second cyclic prefix configuration may be an extended cyclic prefix (ECP) configuration, and the synchronization signal may be a Narrow-Band Primary Synchronization Signal (NB-PSS).

In another example, the first cyclic prefix configuration may be a normal cyclic prefix (NCP) configuration and the second cyclic prefix configuration may be an extended cyclic prefix (ECP) configuration, and the synchronization signal may be a Narrow-Band Secondary Synchronization Signal (NB-SSS).

In an example, at least some of the OFDM symbols carrying the synchronization signal in a subframe for NCP configuration may be used for carrying the synchronization signal in a subframe for ECP configuration.

In another example, in the subframe for NCP configuration, the synchronization signal may be carried by the same OFDM symbols as in the subframe for ECP configuration.

In yet another example, in the subframe for NCP configuration, the synchronization signal may be carried by the OFDM symbols in the same order as in the subframe for ECP configuration.

In an example, one or more of the OFDM symbols carrying the synchronization signal in the subframe of NCP configuration may be manipulated by negation or conjugation when being used to carry the synchronization signal in the subframe of ECP configuration.

In an example, the input to each of the plurality of matched filters may be provided at the same time.

In another example, the apparatus may further include an input delaying unit configured to delay the input to each of the plurality of matched filters individually.

In an example, the peak detector may be further configured to identify which cyclic prefix configuration is being used for the received radio signal.

In a third aspect of the present disclosure, there is provided a user equipment including the apparatus of the second aspect.

The embodiments of the present disclosure at least lead to the following benefits and advantages:
  Providing a solution to detect a synchronization signal including a number of OFDM symbols included in a sequence of OFDM symbols which may have different cyclic prefix configurations;
  Reducing the computational complexity by up to 50% as compared to a legacy approach (time domain filtering over the whole PSS), and thus allowing a hardware, such as a hardware accelerator (HWA), digital signal processor (DSP), and/or central processing unit (CPU) etc., to operate at a lower clock frequency;
  Can be easily adapted to later different specification proposal by changing the configuration of matched filters and delay lines; and
  Reducing the storage requirements and enabling a long battery operation time.

BRIEF DESCRIPTION OF THE DRAWINGS

The above and other objects, features and advantages of the present disclosure will be clear from the following detailed description about the non-limited embodiments of the present disclosure taken in conjunction with the accompanied drawings, in which.

DETAILED DESCRIPTION

Figure 1A:
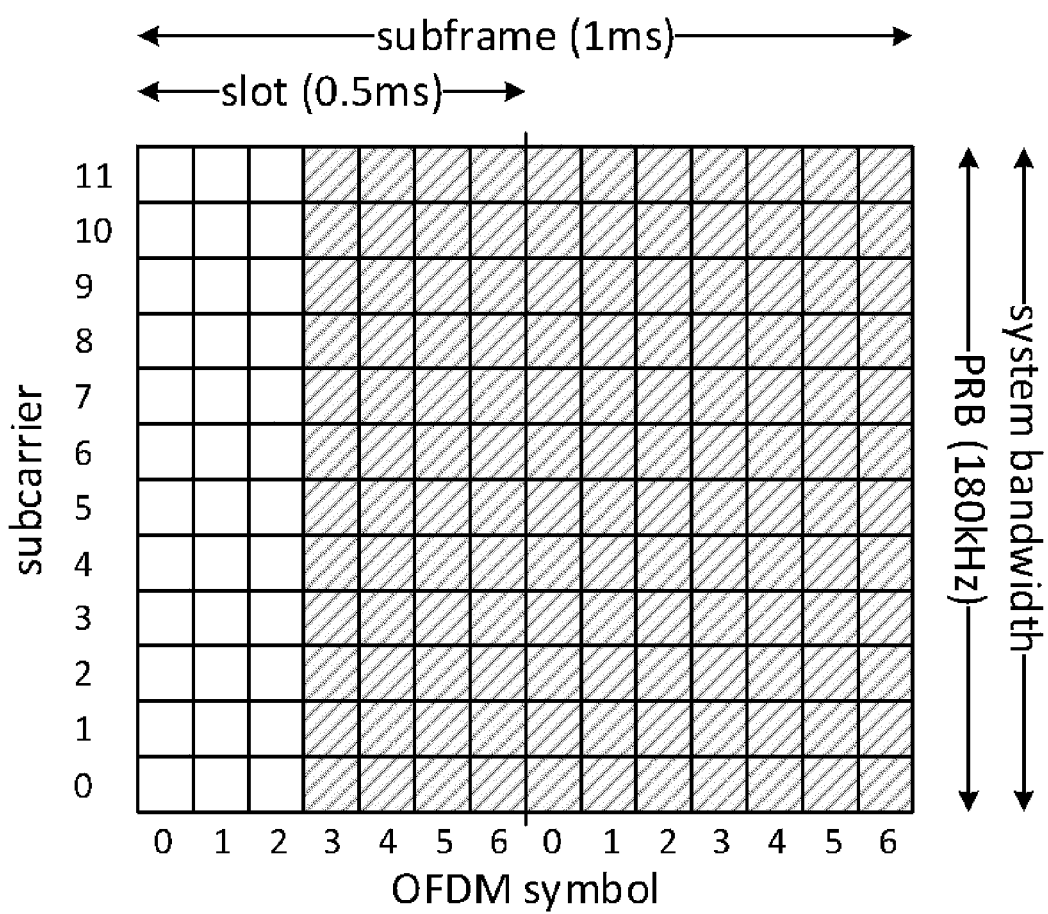
FIG. 1(a) shows a subframe structure of NCP configuration.

In the following detailed description, reference is made to the accompanying drawings, which form a part thereof. In the drawings, similar symbols typically identify similar components, unless context dictates otherwise. The illustrative examples or embodiments described in the detailed description, drawings, and claims are not meant to be limiting. Other examples or embodiments may be utilized, and other changes may be made, without departing from the spirit or scope of the subject matter presented here. It will be readily understood that aspects of this disclosure, as generally described herein, and illustrated in the figures, can be arranged, substituted, combined, and designed in a wide variety of different configurations, all of which are explicitly contemplated and make part of this disclosure.

Figure 1B:
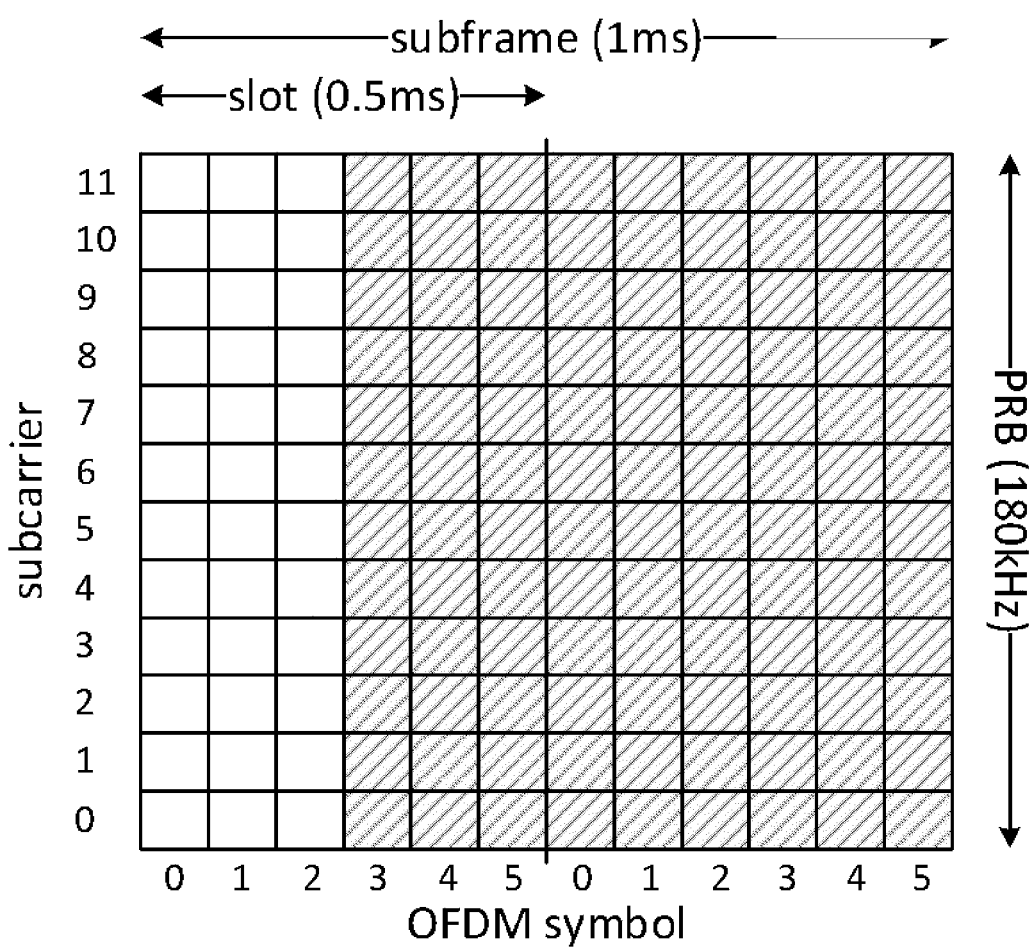
FIG. 1(b) shows a subframe structure of ECP configuration.

FIG. 1(a) shows a subframe structure of NCP configuration and FIG. 1(b) shows a subframe structure of ECP configuration, in which a synchronization signal may be arranged in the shaded area.

In NB-IoT system, the downlink subcarrier spacing may be 15 kHz and the downlink system bandwidth may be 200 kHz, with efficient bandwidth of 180 kHz—being equivalent to a physical resource block in a conventional LTE cell, as shown in FIG. 1.

Synchronization signals, such as Narrow-Band Primary Synchronization Signal (NB-PSS) and Narrow-Band Secondary Synchronization Signal (NB-SSS), are introduced in NB-IoT system. There may be an arrangement of a single instance of NB-PSS and 504 instances of NB-SSS.

A synchronization signal such as NB-PSS or NB-SSS may occupy a predetermined number of OFDM symbols in the subframe that carries it. In an example, the synchronization signal may not occupy the first 3 OFDM symbols in the subframe, because in case NB-IoT is deployed in the bandwidth of a regular LTE cell, Cell Reference Signals (CRSs) of that regular LTE cell will puncture the synchronization signal if necessary. For NCP configuration, the synchronization signal may span 9 or 11 OFDM symbols (to be down-selected to one value) in which 6 to 11 OFDM symbol may be used to carry the synchronization information of the synchronization signal (to be down-selected to one value). For ECP the synchronization signal may span 9

OFDM symbols in which 6 to 9 OFDM symbols may be used to carry the synchronization information of the synchronization signal. For the in-band scenario, NB-PSS and NB-SSS may be boosted by 6 dB relative to the CRS power level in the regular LTE cell. The repetition rates of NB-PSS and NB-SSS might differ, such as being 20 ms and 80 ms respectively.

Figure 2A:
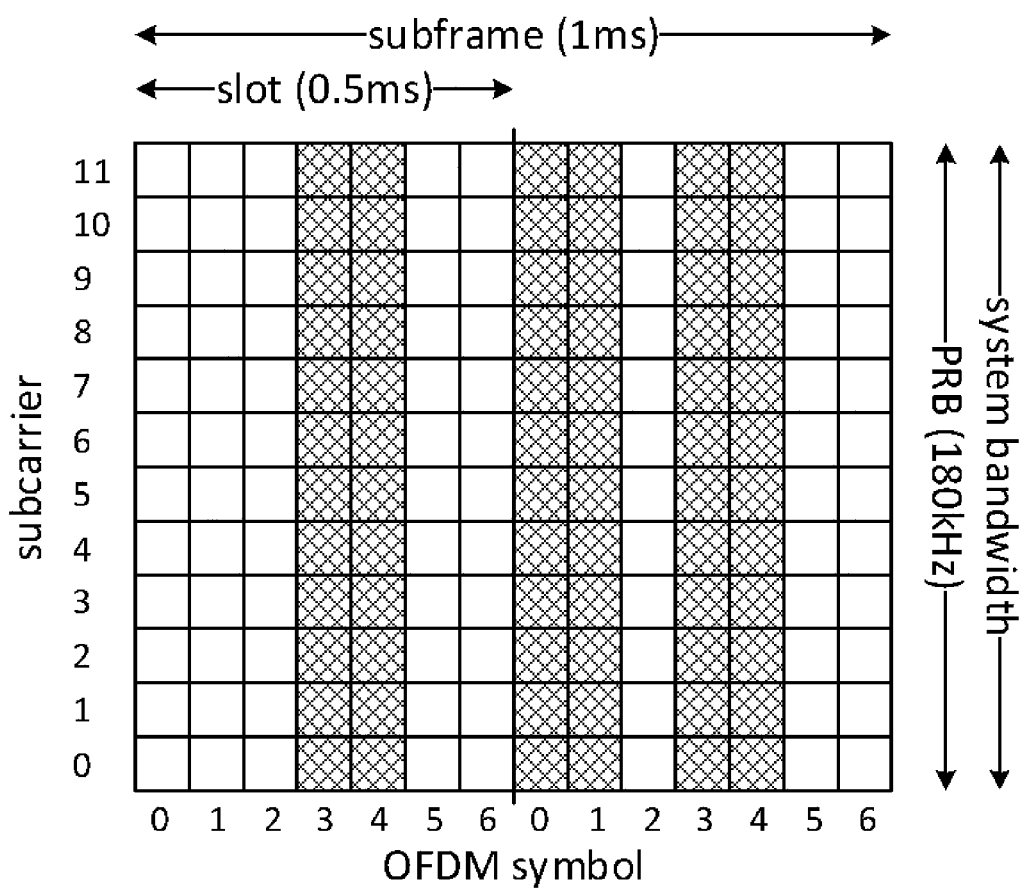
FIG. 2(a) shows an example distribution of a synchronization signal in a subframe of NCP configuration.
Figure 2B:
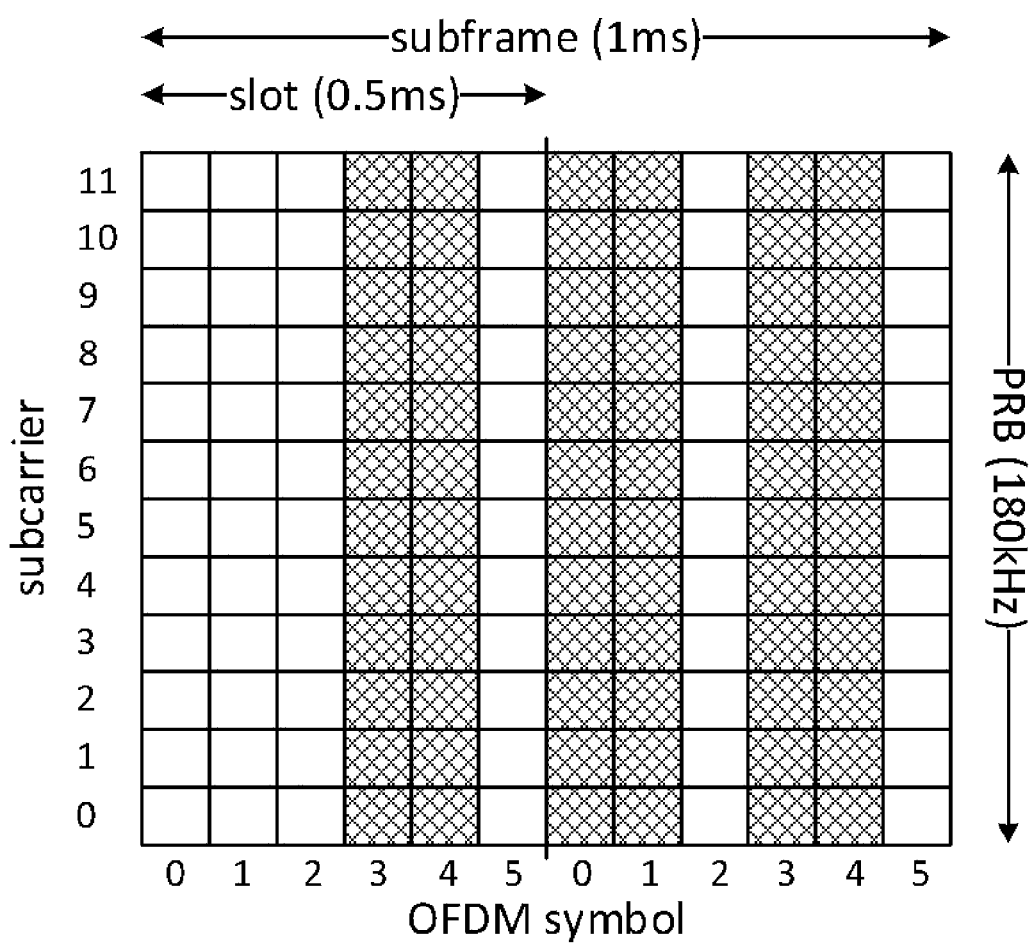
FIG. 2(b) shows an example distribution of a synchronization signal in a subframe of ECP configuration.

FIG. 2(a) shows an example distribution of a synchronization signal in a subframe of NCP configuration and FIG. 2(b) shows an example distribution of a synchronization signal in a subframe of ECP configuration, wherein the OFDM symbols used for carrying the synchronization signal are shaded.

There may be a mapping between a distribution of the synchronization signal in a subframe of the first cyclic prefix configuration and a distribution of the synchronization signal in a subframe of the second cyclic prefix configuration.

As shown in FIG. 2, a synchronization signal such as NB-PSS or NB-SSS spans 9 OFDM symbols for NCP and spans 8 OFDM symbols for ECP configurations. The synchronization information of synchronization signal carried in OFDM symbols $[3_0, 4_0, 0_1, 1_1, 3_1, 4_1]$ for NCP configuration corresponds to that carried in OFDM symbols $[3_0, 4_0, 0_1, 1_1, 3_1, 4_1]$ for ECP configuration, where the subscript "0" or "1" denotes the slot.

However there may be a variety of different mappings. In the present embodiment, at least some of the OFDM symbols carrying the synchronization signal in the subframe for NCP configuration may be used for carrying the synchronization signal in the a subframe for ECP configuration. In this context, the number of OFDM symbols used for carrying the synchronization signal in the subframe may be the same or different between NCP and ECP configurations, the OFDM symbols used for carrying the synchronization signal in the subframe may be the same or different between NCP and ECP configurations, and the order in which the synchronization signal is carried by the OFDM symbols in the subframe may be the same or different between NCP and ECP configurations. As an example, in the subframe for NCP configuration, the synchronization signal may be carried by the same OFDM symbols as in the subframe for ECP configuration. As another example, in the subframe for NCP configuration, the synchronization signal may be carried by the OFDM symbols in the same order as in the subframe for ECP configuration.

Some examples of the mapping are provided as follows. In an example, there may be 8 OFDM symbols $[3_0, 4_0, 5_0, 0_1, 1_1, 3_1, 4_1, 5_1]$ used for carrying the synchronization signal for NCP configuration but only 6 OFDM symbols $[3_0, 4_0, 0_1, 1_1, 3_1, 4_1]$ for ECP configuration, with $[3_0, 4_0, 5_0, 0_1, 1_1, 3_1, 4_1, 5_1]$ mapping to $[3_0, 4_0, --, 0_1, 1_1, 3_1, 4_1, --]$ for example, where -- denotes nonexistence of a mapping for the corresponding OFDM symbol. Another example of $[3_0, 4_0, 0_1, 1_1, 3_1, 4_1]$ mapping to $[3_0, 4_0, 0_1, 1_1, 3_1, 5_1]$ is possible. Yet another example of $[3_0, 4_0, 0_1, 1_1, 3_1, 4_1]$ mapping to $[4_0, 3_0, 0_1, 1_1, 3_1, 4_1]$ is also possible. FIG. 2 only shows the example of $[3_0, 4_0, 0_1, 1_1, 3_1, 4_1]$ mapping to $[3_0, 4_0, 0_1, 1_1, 3_1, 4_1]$.

Simple mathematical manipulations of the mappings as described above can be accommodated by adapting the implementation correspondingly (both on network and NB-IoT device sides). Such manipulations may for instance include introducing a sign change or a conjugation between one OFDM symbol for the NCP configuration and the corresponding (mapped) OFDM symbol for the ECP configuration.

Figures 3A, 3B:
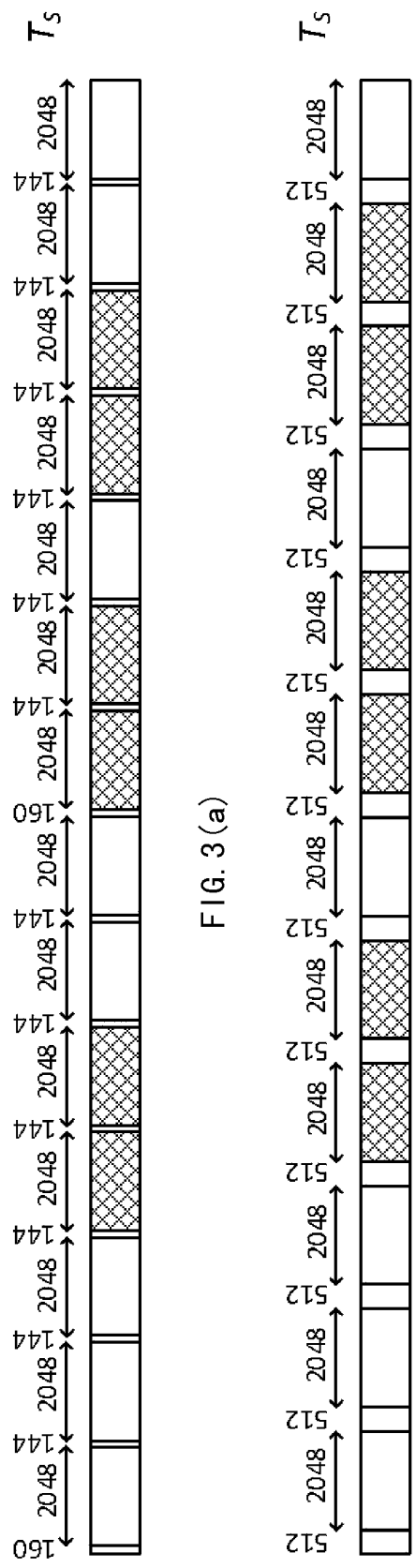
FIGS. 3(a) and 3(b) are schematic diagrams showing the detail of the example distributions of FIGS. 2(a) and 2(b) respectively.

FIGS. 3(a) and 3(b) are schematic diagrams showing the detail of the example distributions of FIGS. 2(a) and 2(b) respectively. In the present disclosure, the lengths of the cyclic prefixes and OFDM symbols are measured by fundamental time unit $T_S$ for the purpose of providing a general description, although the number of samples by which each OFDM symbol is represented depends on the selected sampling rate which is UE implementation specific but has a lower limit that depends on the cell bandwidth.

Referring to FIG. 3, the length of an OFDM symbol is 2048 $T_S$. For NCP configuration, the cyclic prefix of the first OFDM symbol in a slot has a length of 160 $T_S$ and each of the cyclic prefixes of the remaining OFDM symbols has a length of 144 $T_S$. For ECP configuration, each cyclic prefix is 512 $T_S$.

As shown in FIG. 3, a cyclic prefix of NCP configuration is shorter than a cyclic prefix of ECP configuration. As the length of a subframe is fixed to 1 ms, the number of OFDM symbols included in a subframe for NCP configuration is larger than the number of OFDM symbols included in a subframe for ECP configuration.

Figure 4:
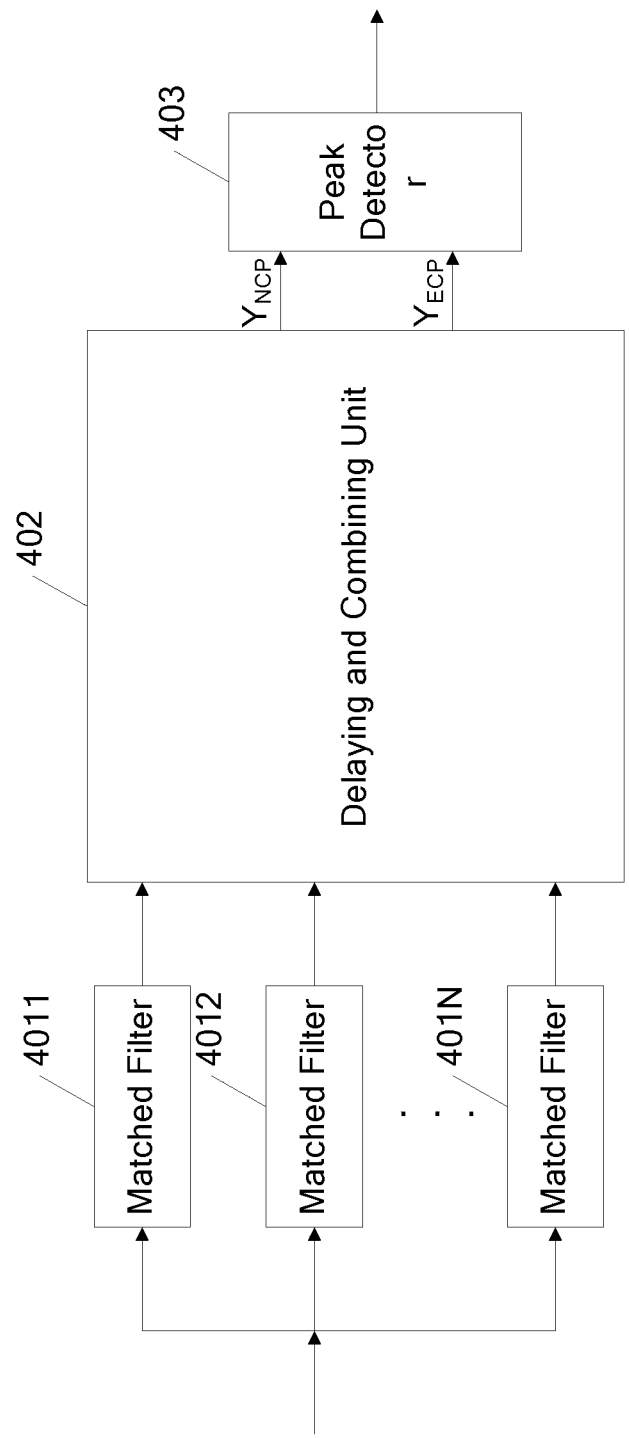
FIG. 4 is a block diagram showing an apparatus 400 for detecting a synchronization signal including a number of OFDM symbols included in a sequence of OFDM symbols in a received radio signal according to an embodiment of the present disclosure.

FIG. 4 is a block diagram showing an apparatus 400 for detecting a synchronization signal including a number of OFDM symbols included in a sequence of OFDM symbols in a received radio signal according to an embodiment of the present disclosure.

Referring to FIG. 4, the apparatus 400 is provided for detecting a synchronization signal including a number of OFDM symbols included in a sequence of OFDM symbols in a received radio signal wherein the OFDM symbols have a first cyclic prefix configuration or a second cyclic prefix configuration. The apparatus 400 may include a plurality of matched filters 4011, 4012, . . . , 401N (which will be collectively referred to as "matched filters 401" hereinafter), a delaying and combining unit 402, and a peak detector 403.

The matched filters 401 may be configured to filter the radio signal to obtain a correlation for each OFDM symbol in the synchronization signal, wherein each of the matched filters 401 provides a correlation with one OFDM symbol in the synchronization signal.

The delaying and combining unit 402 may be configured to delay and combine the outputs of the plurality of matched filters 401 in a first way to provide a first combined output $Y_{NCP}$ for the first cyclic prefix configuration and delay and combine the outputs of the plurality of matched filters 401 in a second way to provide a second combined output $Y_{ECP}$ for the second cyclic prefix configuration.

The peak detector 403 may be configured to detect a correlation peak indicative of the synchronization signal in one of the first or second combined outputs $Y_{NCP}$ and $Y_{ECP}$.

As an example, each of the plurality of matched filters 401 may have the same length as one OFDM symbol. Alternatively, each of the plurality of matched filters 401 may have a length larger than one OFDM symbol but less than or equal to one OFDM symbol plus one cyclic prefix for the cyclic prefix configuration having the shorter cyclic prefixes of the first and second cyclic prefix configurations.

Preferably, the plurality of matched filters 401 may be frequency compensated matched filters derived for a frequency offset hypothesis, and the delaying and combining unit 402 may be further configured to modify the phases of the outputs of the plurality of matched filters 401 by using one or more phase factors associated with the frequency offset hypothesis to implement a continuous phase at the first and second combined outputs $Y_{NCP}$ and $Y_{ECP}$.

As an example, the first cyclic prefix configuration may be NCP configuration and the second cyclic prefix configuration may be ECP configuration, and the synchronization signal may be NB-PSS or NB-SSS.

As an example, at least some of the OFDM symbols carrying the synchronization signal in a subframe for NCP configuration may be used for carrying the synchronization signal in a subframe for ECP configuration. For example, in the subframe for NCP configuration, the synchronization signal may be carried by the same OFDM symbols as in the subframe for ECP configuration. For example, in the subframe for NCP configuration, the synchronization signal may be carried by the OFDM symbols in the same order as in the subframe for ECP configuration. As an example, one or more of the OFDM symbols carrying the synchronization signal in the subframe of NCP configuration is manipulated by negation or conjugation when being used to carry the synchronization signal in the subframe of ECP configuration.

As an example, the input to each of the plurality of matched filters 401 may be provided at the same time. Alternatively, the input to each of the plurality of matched filters 401 may be delayed individually.

As an example, the peak detector 403 may be further configured to identify which cyclic prefix configuration is being used for the received radio signal.

Figure 5:
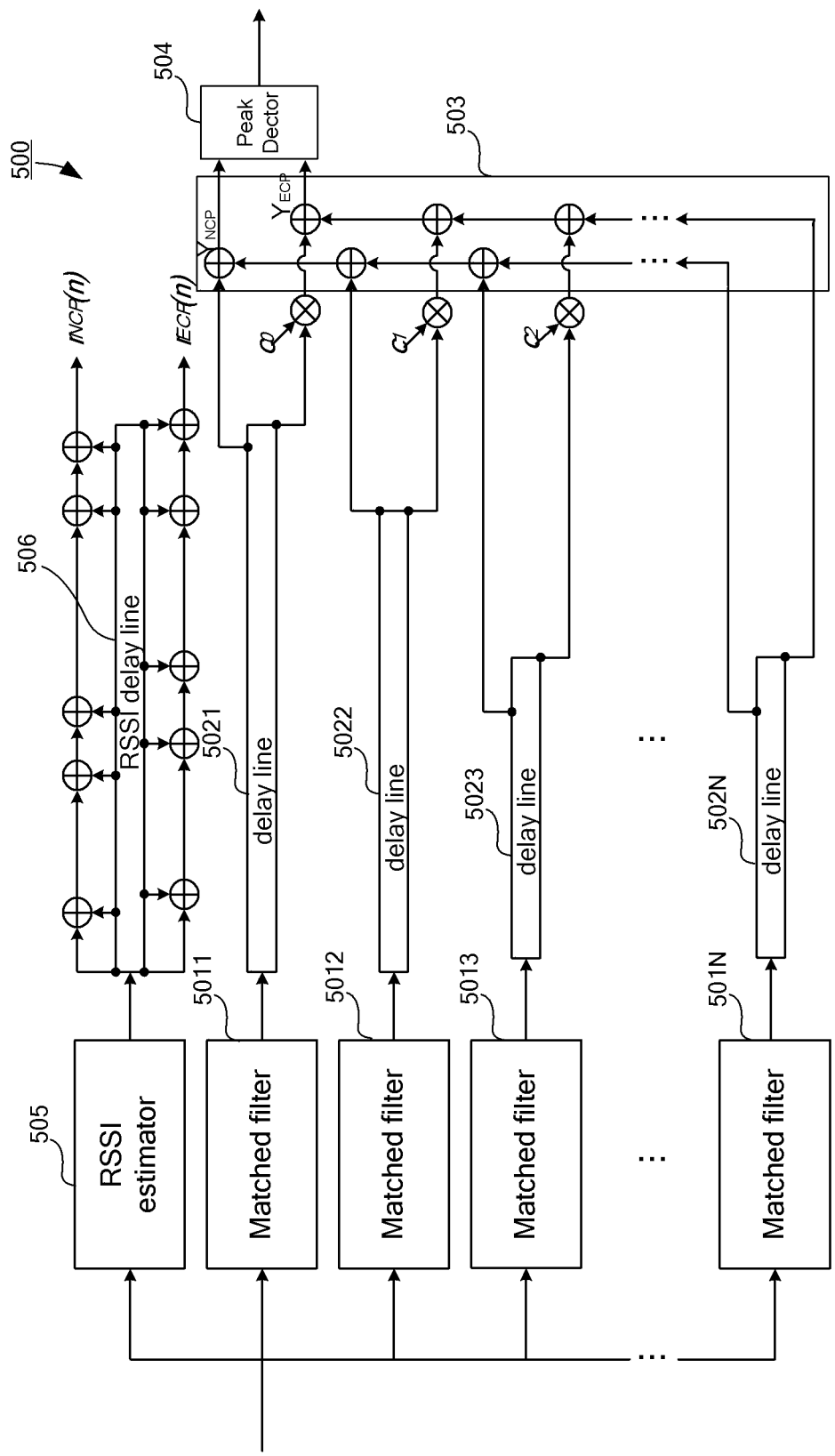
FIG. 5 is a block diagram showing an apparatus 500 for detecting a synchronization signal including a number of OFDM symbols included in a sequence of OFDM symbols in a received radio signal according to an embodiment of the present disclosure.

FIG. 5 is a block diagram showing an apparatus 500 for detecting a synchronization signal including a number of OFDM symbols included in a sequence of OFDM symbols in a received radio signal according to an embodiment of the present disclosure, wherein the OFDM symbols may have a first cyclic prefix configuration or a second cyclic prefix configuration.

In this embodiment, the first cyclic prefix configuration may be NCP configuration and the second cyclic prefix configuration may be ECP configuration, and the synchronization signal may be NB-PSS or NB-SSS. The synchronization signal may have any of the distributions and mappings as described above with reference to FIGS. 1-3.

Referring to FIG. 5, the apparatus 500 may include a plurality of matched filters 5011, 5012, 5013, ..., 501N (which will be collectively referred to as "matched filters 501" hereinafter) and a peak detector 504. The apparatus 500 may also include a delaying and combining unit to delay and combine the outputs of the plurality of matched filters 401 in a first way to provide a first combined output $Y_{NCP}$ for the first cyclic prefix configuration and delay and combine the outputs of the plurality of matched filters 401 in a second way to provide a second combined output $Y_{ECP}$ for the second cyclic prefix configuration. The delaying and combining unit may include a plurality of delay lines 5021, 5022, 5023, ..., 502N (which will be collectively referred to as "delay lines 502" hereinafter) and a combiner 503.

The matched filters 501 may be implemented by the matched filters 401 of FIG. 4. As an example, each of the matched filters 501 may have a length of 2048 which is equal to the length of one OFDM symbol as shown in FIG. 3. This length is enough for the filtering of one OFDM symbol for both the NCP and ECP configuration. Preferably, each of the matched filters 501 may have a length larger than 2048 and less than or equal to 2048+144 $T_S$ (corresponding to the length of one OFDM symbol plus a NCP cyclic prefix), for the purpose of providing some margin.

The delay lines 502 may be configured to delay the outputs of the plurality of matched filters 501. As an example, each of the delay lines 502 may be implemented by a tapped delay line in case of HWA or an indexed circular buffer in case of DSP or CPU. One and the same delay line may be used for both the NCP and ECP configurations, but the position or index at which information is retrieved depends on the cyclic prefix configuration. As shown in FIG. 5, the delay line 5021 is connected to the output of the matched filter 5011, the delay line 5022 is connected to the output of the matched filter 5022, the delay line 5023 is connected to the output of the matched filter 5033, ..., and the delay line 502N is connected to the output of the matched filter, as shown in FIG. 2.

Each of the delay lines 502 may be configured with first and second delay factors, which may be calculated based on a mapping between a distribution of the synchronization signal in a subframe of the first cyclic prefix configuration and a distribution of the synchronization signal in a subframe of the second cyclic prefix configuration, to provide a first delayed output for the first cyclic prefix configuration and a second delayed output for the second cyclic prefix configuration respectively.

For example, the first and second delay factors of each of the delay lines 502 may be calculated based on any of the mappings as described above with reference to FIGS. 1-3. One or more of the OFDM symbols carrying the synchronization signal in the subframe of NCP configuration may be manipulated by negation or conjugation when being used to carry the synchronization signal in the subframe of ECP configuration. Note that such negation or conjugation may easily be handled by manipulating the delayed output(s) from the delay lines 501 for either of the first and second cyclic prefix configurations, such as the first and/or second delayed output(s) of one or more of the delay lines 501.

Taking the mapping shown in FIG. 2, i.e. [$3_0$, $4_0$, $0_1$, $1_1$, $3_1$, $4_1$] mapping to [$3_0$, $4_0$, $0_1$, $1_1$, $3_1$, $4_1$], as an example. In this example, the number N may be equal to 6 and the delay lines 502 may be configured according to Table 1. It should be appreciated that the number N and the configuration of the delay lines 501 may vary depending on the mapping between the distributions of the synchronization signal for the first and second configurations.

TABLE 1

| Delay line | Delay [$T_S$] | |
|---|---|---|
| | First delay factor (for NCP) | Second delay factor (for ECP) |
| 5021 | 17552 | 17920 |
| 5022 | 15360 | 15360 |
| 5022 | 8768 | 10240 |
| 5024 | 6576 | 7680 |
| 5025 | 2192 | 2560 |
| 5026 | 0 | 0 |

Under the mapping of FIG. 2 and the configuration of delay lines in Table 1, the matched filter operation needs 5 delay lines (the last one 5026 has delay factors of 0) capable of storing 53760 $T_S$ where as stated above the actual number of samples depends on the sampling frequency in use. In other words, the length of 53760 $T_S$ is chosen to ensure that whatever the subframe starts or whatever one start to record samples, there must be one full synchronization signal such as NB-PSS or NB-SSS inside 53760 $T_S$ for both NCP and ECP configurations. This can be derived based on Table 1 and FIG. 3.

According to the distributions of the synchronization signal as shown in FIG. 2, the distance between OFDM symbols carrying the synchronization signal may be calculated as follows, wherein OFDM symbol carrying the synchronization signal and OFDM symbol not carrying the synchronization signal will be referred to as synchronization signal symbol and non-synchronization signal symbol respectively for the purpose of simplicity.

For NCP: 0 (1st synchronization signal symbol, 2048+144)+2192 (2nd synchronization signal symbol)+2192 (non-synchronization signal symbol)+2192 (non-synchronization signal symbol)+2208 (3rd synchronization signal symbol)+2048 (4th synchronization signal symbol)+2192 (non-synchronization signal symbol)+2192 (non-synchronization signal symbol)+2192 (5th synchronization signal symbol)=totally, 17522 $T_S$ (distance between the first sample of 1st synchronization signal symbol and the first sample of the last synchronization signal symbol).

For ECP: 0 (1st synchronization signal symbol, 2048+512)+2560 (2nd synchronization signal symbol)+2560 (non-synchronization signal symbol)+2560 (3rd synchronization signal symbol)+2560 (4th synchronization signal symbol)+2560 (non-synchronization signal symbol)+2560 (5th synchronization signal symbol)=totally, 17920 $T_S$ (distance between the first sample of 1st synchronization signal symbol and the first sample of the last synchronization signal symbol).

By means of the distance between OFDM symbols carrying synchronization signal symbol, one will get the time needed to waiting for filtering all the samples for the synchronization signal and for further processing.

In view of above, the total delay line storage needed is 53760+17920 $T_S$.

The combiner 503 may be configured to combine the outputs of the plurality of delay lines 502 to provide a first combined output $Y_{NCP}$ for the first cyclic prefix configuration and a second combined output $Y_{ECP}$ for the second cyclic prefix configuration. As an example, the combiner 503 may include a plurality of adders which are divided into two groups, with one group being arranged to combine the first delayed output from each of the delay lines 501 to provide $Y_{NCP}$ and the other group being arranged to combine the second delayed output from each of the delay lines 501 to provide $Y_{ECP}$.

The peak detector 504 may be implemented by the peak detector 403 of FIG. 4.

The above described apparatus 500 may be applied in different scenarios such as a scenario with no frequency offset assumption and a scenario with a frequency offset assumption. In case of there is a frequency offset assumption, such as a frequency offset hypothesis selected from a frequency offset grid, the plurality of matched filters 501 may be frequency compensated matched filters derived for a frequency offset hypothesis, and the delaying and combining unit of the apparatus 500 may be further configured to modify the phases of the outputs of the plurality of matched filters 501 by using one or more phase factors associated with the frequency offset hypothesis to implement a continuous phase at the first and second combined outputs $Y_{NCP}$ and $Y_{ECP}$. The frequency offset hypothesis may be selected from a frequency offset grid. The frequency offset grid may be for example, but not limited to, in steps of 7.5 kHz, e.g. [ . . . , −15 kHz, −7.5 kHz, 0 Hz, 7.5 kHz, 15 kHz, . . . ].

As an example, the delaying and combining unit of the apparatus 500 may further include one or more phasors having respective phase factors determined based on the frequency offset hypothesis. As shown in FIG. 5, each of the delay lines 501 has one respective phasors connected at its second delayed output, except for the last delay line 501N. Particularly, under the mapping shown in FIG. 2, e.g. phasors with phase factors $c_0$ through $c_4$ are respectively connected to the five delay lines 5011-5015 at their second delayed outputs. In case of no frequency offset assumption, the phase factors may all be set to unity. In case of a frequency offset hypothesis, the phase factors may be set to respective complex values having absolute value of one. In this way, a continuous phase can be achieved at both the outputs $Y_{NCP}$ and $Y_{ECP}$.

The peak detector 504 may be configured to detect a correlation peak indicative of the synchronization signal in one of the first or second combined outputs $Y_{NCP}$ and $Y_{ECP}$. For example, the correlation may be represented by the magnitude or magnitude-square in the output stream. The peak detector 504 may detect the correlation peak indicative of the synchronization signal by looking for the largest magnitude or largest magnitude-square in the one of $Y_{NCP}$ and $Y_{ECP}$ according to any existing method, and adding the largest magnitude or largest magnitude-square captured over a full synchronization signal repetition period to a margin including the number of OFDM symbols spanned by a synchronization signal to generate a correlation peak indicative of the potential presence of a synchronization signal. The magnitudes or magnitude-square values may additionally be stored in random access memory or other medium to facilitate accumulation with results obtained at different synchronization signal detection attempts.

The peak detector 504 may further be configured to identify which cyclic prefix configuration is being used for the received radio signal.

Preferably, the apparatus 500 may further include a Received Signal Strength Indication (RSSI) estimating unit which includes an estimator 505, a RSSI delay line 506 and a plurality of adders. The RSSI estimator 505 may be an OFDM symbol-based RSSI estimator that calculates the sum of magnitude-squared samples over the same length as used by the matched filters 501. The outputs of the RSSI estimator 505 is fed to the RSSI delay line 506. The RSSI delay line 506 may have the same length as delay line 5021. Taking the mapping shown in FIG. 2 as an example again, the delays (time instants) of the RSSI delay line 506 may be set according to Table 1. It should be noted that the configuration of the RSSI delay line 606 may vary depending on the mapping between the distributions of the synchronization signal for the first and second configurations. The symbol-based RSSI estimates at the delays (time instants) specified in Table 1 from the RSSI delay line 506 may be summed up by the adders to provide a RSSI estimate output $r_{NCP}$ for NCP configuration and a RSSI estimate output $r_{ECP}$ for ECP configuration. The outputs $r_{NCP}$ and $r_{ECP}$ can be used for estimating the momentary (Signal and Interference to Noise Ratio) SINR for each potential candidate synchronization signal. Particularly, by forming $$\eta_{NCP}(n) = \frac{|y_{NCP(n)}|^2}{r_{NCP}(n)}$$

and $$\eta_{ECP}(n) = \frac{|y_{ECP(n)}|^2}{r_{ECP}(n)},$$

candidate selection can be performed according to existing candidate selection method. The outputs $r_{NCP}$ and $r_{ECP}$ may also be provided to the peak detector 504. In this case, for each of the NCP and ECP configuration, it is possible to determine not only the absolute signal power but also the momentary SINR for use in the synchronization signal detection.

Figure 6:
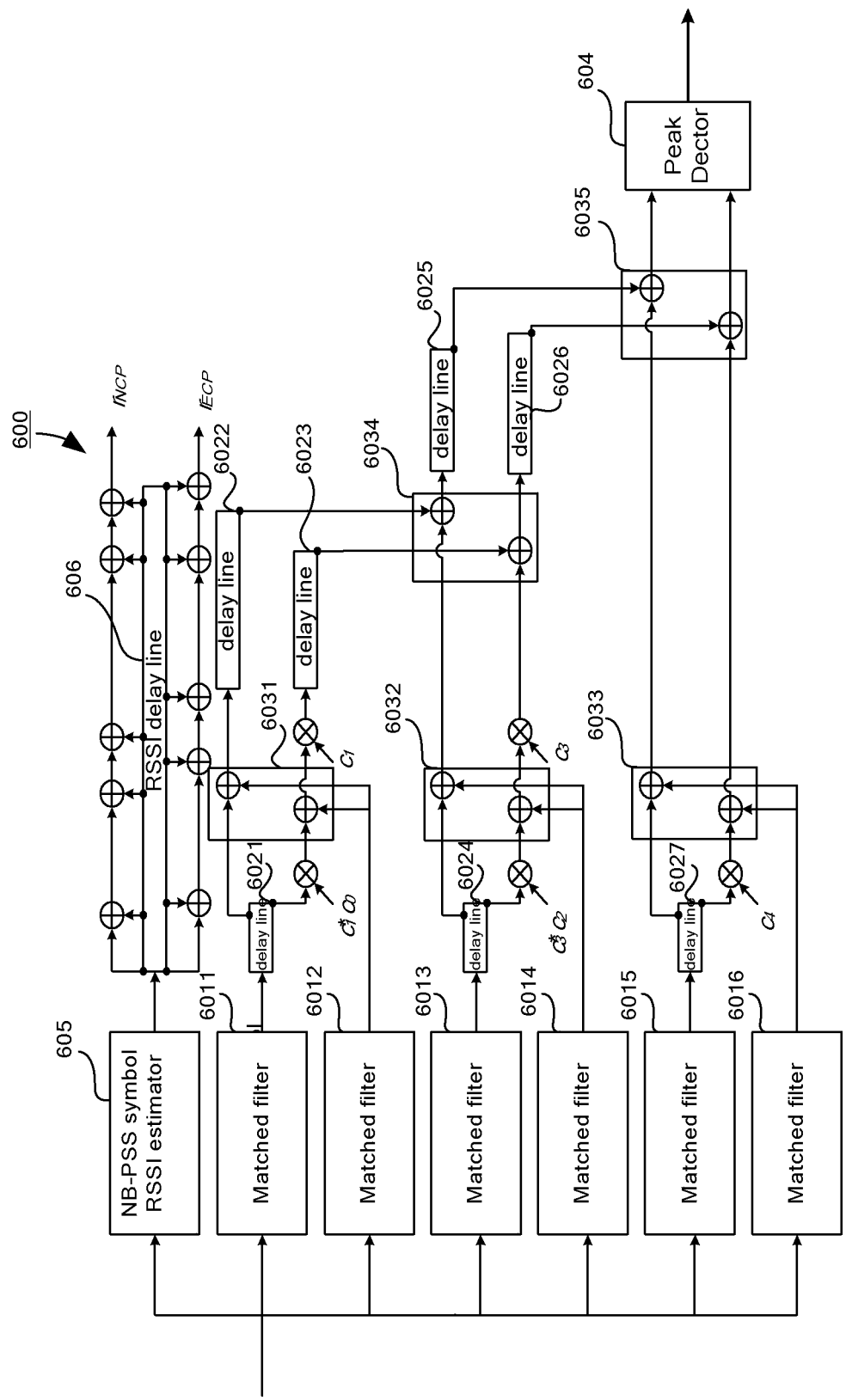
FIG. 6 is a block diagram showing an apparatus 600 for detecting a synchronization signal including a number of OFDM symbols included in a sequence of OFDM symbols in a received radio signal according to an embodiment of the present disclosure.

FIG. 6 is a block diagram showing an apparatus 600 for detecting a synchronization signal including a number of OFDM symbols included in a sequence of OFDM symbols in a received radio signal according to an embodiment of the present disclosure, wherein the OFDM symbols may have a first cyclic prefix configuration or a second cyclic prefix configuration.

The difference between the apparatus 600 of FIG. 6 and the apparatus 500 of FIG. 5 mainly resides in the implementation of the delaying and combining unit. For the purpose of simplicity and clarity, repeated descriptions on the same components are omitted.

Referring to FIG. 6, the apparatus 600 may include a plurality of matched filters 6011, 6012, 6013, . . . , 601N (which will be collectively referred to as "matched filters 601" hereinafter), a delaying and combining unit and a peak detector 604. The matched filters 601 and the peak detector 604 may be implemented by the matched filters 501 and the peak detector 504 respectively.

It should be noted that the following description is made based on the example mapping shown in FIG. 2, i.e. [$3_0$, $4_0$, $0_1$, $1_1$, $3_1$, $4_1$] mapping to [$3_0$, $4_0$, $0_1$, $1_1$, $3_1$, $4_1$], so that the number N of the matched filters 601 is chosen to be 6, as shown in FIG. 6. In fact, the number of the matched filters 601 may vary depending on the mapping between the distributions of the synchronization signal for NCP and ECP configurations.

The delaying and combining unit of the apparatus 600 may be configured to delay and combine the outputs of the plurality of matched filters 601 in a first way to provide a first combined output $Y_{NCP}$ for the first cyclic prefix configuration and delay and combine the outputs of the plurality of matched filters 601 in a second way to provide a second combined output $Y_{ECP}$ for the second cyclic prefix configuration. The delaying and combining unit of the apparatus 600 may include a plurality of delay lines 6021, 6022, 6023, . . . , 6027 (which will be collectively referred to as "delay lines 602" hereinafter) and a plurality of combiners 6031, 6032, 6033, 6034 and 6035 (which will be collectively referred to as "combiners 603" hereinafter). It should be noted that the number of the delay lines 602 and the number of the combiners 603 may vary depending on the mapping between the distributions of the synchronization signal for the first and second configurations.

The delay lines 602 and the combiners 603 may be arranged into stages to delay and combine the outputs of the plurality of matched filters 601 hierarchically to provide a first combined output $Y_{NCP}$ for the first cyclic prefix configuration and a second combined output $Y_{ECP}$ for the second cyclic prefix configuration.

Referring to FIG. 2, the delay lines 6021, 6024 and 6027 are connected to the outputs of the matched filters 6011, 6013 and 6015 respectively. The combiner 6031 combines a first delayed output of the delay line 6021 and the output of the matched filter 6012 to provide a first combined output to the delay line 6022, and combines the second delayed output of the delay line 6021 and the output of the matched filter 6012 to provide a second combined output to the delay line 6023. Similarly, the combiner 6032 combines the a first delayed output of the delay line 6024 and the output of the matched filter 6014 to provide a first combined output to the combiner 6034, and combines the second delayed output of the delay line 6024 and the output of the matched filter 6014 to provide a second combined output to the combiner 6034.

The combiner 6033 combines the a first delayed output of the delay line 6027 and the output of the matched filter 6016 to provide a first combined output to the combiner 6035, and combines the second delayed output of the delay line 6027 and the output of the matched filter 6016 to provide a second combined output to the combiner 6035. The combiners 6034 combines the output of the delay line 6022 and the first combined output of the combiners 6032 to provide a first combined output to the delay line 6025, and combines the output of the delay line 6023 and the second combined output of the combiner 6032 to provide a second combined output to the delay line 6026. The combiner 6035 combines the output of the delay line 6025 and the first combined output of the combiner 6033 to provide the output $Y_{NCP}$ for NCP configuration, and combines the output of the delay line 6026 and the second combined output of the combiner 6033 to provide the output $Y_{ENP}$ for ECP configuration. Similar to the delay lines 502, each of the delay lines 602 may be configured with first and second delay factors, which may be calculated based on a mapping between a distribution of the synchronization signal in a subframe of the first cyclic prefix configuration and a distribution of the synchronization signal in a subframe of the second cyclic prefix configuration, to provide a first delayed output for the first cyclic prefix configuration and a second delayed output for the second cyclic prefix configuration respectively. Each of the delay lines 602 may be configured with first and second delay factors, which may be calculated based on a mapping between a distribution of the synchronization signal in a subframe of the first cyclic prefix configuration and a distribution of the synchronization signal in a subframe of the second cyclic prefix configuration, to provide a first delayed output for the first cyclic prefix configuration and a second delayed output for the second cyclic prefix configuration respectively.

Under the mapping shown in FIG. 2, the delay lines 602 may be configured according to Table 2. It should be appreciated that the configuration of the delay lines 501 may vary depending on the mapping between the distributions of the synchronization signal for the first and second configurations, e.g. any of the variety of mappings as described above with reference to FIGS. 1-3.

TABLE 2

| Delay line | Delay [$T_S$] | |
| --- | --- | --- |
| | First delay factor (for NCP) | Second delay factor (for ECP) |
| 6021 | 2192 | 2560 |
| 6022 | 6592 | — |
| 6023 | — | 5120 |
| 6024 | 2192 | 2560 |
| 6025 | 4384 | — |
| 6026 | — | 5120 |
| 6027 | 2192 | 2560 |

Under the mapping of FIG. 2 and the configuration of delay lines of Table 2, the total delay line storage needed is 28896+17920 $T_S$, which is significantly less than the apparatus 500.

Depending on the implementation of the delay lines, a combination of delay lines 6022 and 6023, which may be implemented by a delay line #1 for both NCP and ECP configurations, may have to accommodate one more bit than the delay line 6021 which may be implemented by a delay line #0; and a combination of delay lines 6025 and 6026 implemented by a delay line #3 one more bit than delay line

1. However if implemented on a DSP or CPU, all delay lines anyway may be using the same bit width (e.g. complex integer 16+16 bit), and thus this embodiment can be used to reduce the footprint on the random access memory.

Each of the combiners 603 may include two adders, one for its first combined output and one for its second combined output.

As an example, the delaying and combining unit of the apparatus 600 may further include one or more phasors having respective phase factors determined based on the frequency offset hypothesis. As shown in FIG. 6, phasors with phase factors $c_1*c_0$, $c_3*c_2$, and $c_4$ are connected to the second delayed outputs of the delay lines 6021, 6024, and 6027 respectively; and phasors with phase factors $c_1$ and $c_3$ are connected to the second combined output of the combiners 6031 and 6032 respectively. The asterisk (*) denotes conjugation. In case of no frequency offset assumption, the phase factors may all be set to unity. In case of a frequency offset hypothesis, the phase factors may be set to respective complex values having absolute value of one. In this way, a continuous phase can be achieved at both the outputs $Y_{NCP}$ and $Y_{ECP}$.

Likewise, the apparatus 600 may further include a RSSI estimating unit which includes an estimator 605, a RSSI delay line 606 and a plurality of adders.

For the apparatus 500 and 600 as described above, the input to each of the plurality of matched filters 501/601 may be provided at the same time. As an alternative example, the input to each of the plurality of matched filters 501/601 may be individually delayed. This will be described below as an embodiment with reference to FIG. 7, on the basis of the apparatus 500. It should be appreciated that, this concept may also be implemented on the basis of the apparatus 600.

Figure 7:
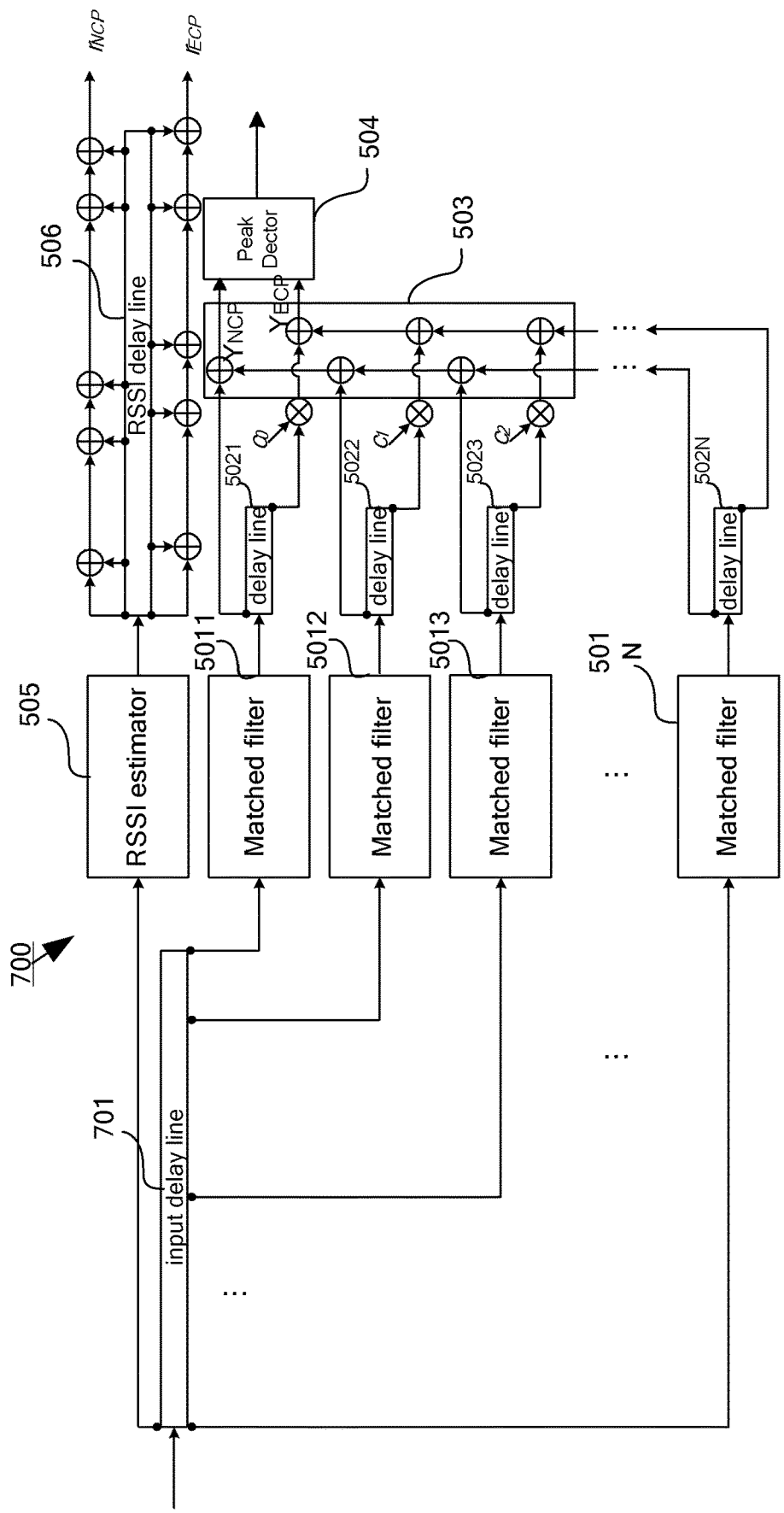
FIG. 7 is a block diagram showing an apparatus 700 for detecting a synchronization signal including a number of OFDM symbols included in a sequence of OFDM symbols in a received radio signal according to an embodiment of the present disclosure.

FIG. 7 is a block diagram showing an apparatus 700 for detecting a synchronization signal including a number of OFDM symbols included in a sequence of OFDM symbols in a received radio signal according to an embodiment of the present disclosure, wherein the OFDM symbols may have a first cyclic prefix configuration or a second cyclic prefix configuration.

The difference between the apparatus 700 of FIG. 7 and the apparatus 500 of FIG. 5 mainly resides in that an input delay line 701 is included. For the purpose of simplicity and clarity, repeated descriptions on the same components are omitted.

Referring to FIG. 7, the apparatus 700 may further include an input delay line 701 configured to delay the input to each of the plurality of matched filters 701 individually. In this embodiment, the least inter-synchronization signal symbol distance with respect to cyclic prefix configuration may be handled by using different delays induced by the input delay line 701 in the input to the respective matched filters 501, and the difference between cyclic prefix configurations may be handled by the delay lines 502 disposed after respective matched filters 501.

Taking the mapping shown in FIG. 2 as an example, the input delay line 701 for inducing input delay and the delay lines 502 for inducing output delay may be configured according to Table 3.

TABLE 3

| Matched filter | Input delay [$T_S$] | Output delay [$T_S$] | |
|---|---|---|---|
| | | First delay factor (for NCP) | Second delay factor (for ECP) |
| #0 | 17552 | 0 | 368 |
| #1 | 15360 | 0 | 0 |
| #2 | 8768 | 0 | 1472 |

TABLE 3-continued

| Matched filter | Input delay [$T_S$] | Output delay [$T_S$] | |
|---|---|---|---|
| | | First delay factor (for NCP) | Second delay factor (for ECP) |
| #3 | 6576 | 0 | 1104 |
| #4 | 2192 | 0 | 368 |
| #5 | 0 | 0 | 0 |

Under the mapping of FIG. 2 and the configuration of delay lines of Table 3, the total delay line storage needed is 17552+3312+17920 $T_S$, the least of the apparatus 500, 600 and 700.

As an example, any of the above described apparatus 400-700 may be implemented by a synchronization signal detector, such as a NB-PSS detector or a NB-SSS detector. The present disclosure is also directed to a user equipment including any of the above described apparatus 400-700. As an example, the user equipment may be a NB-IoT device.

Figure 8:
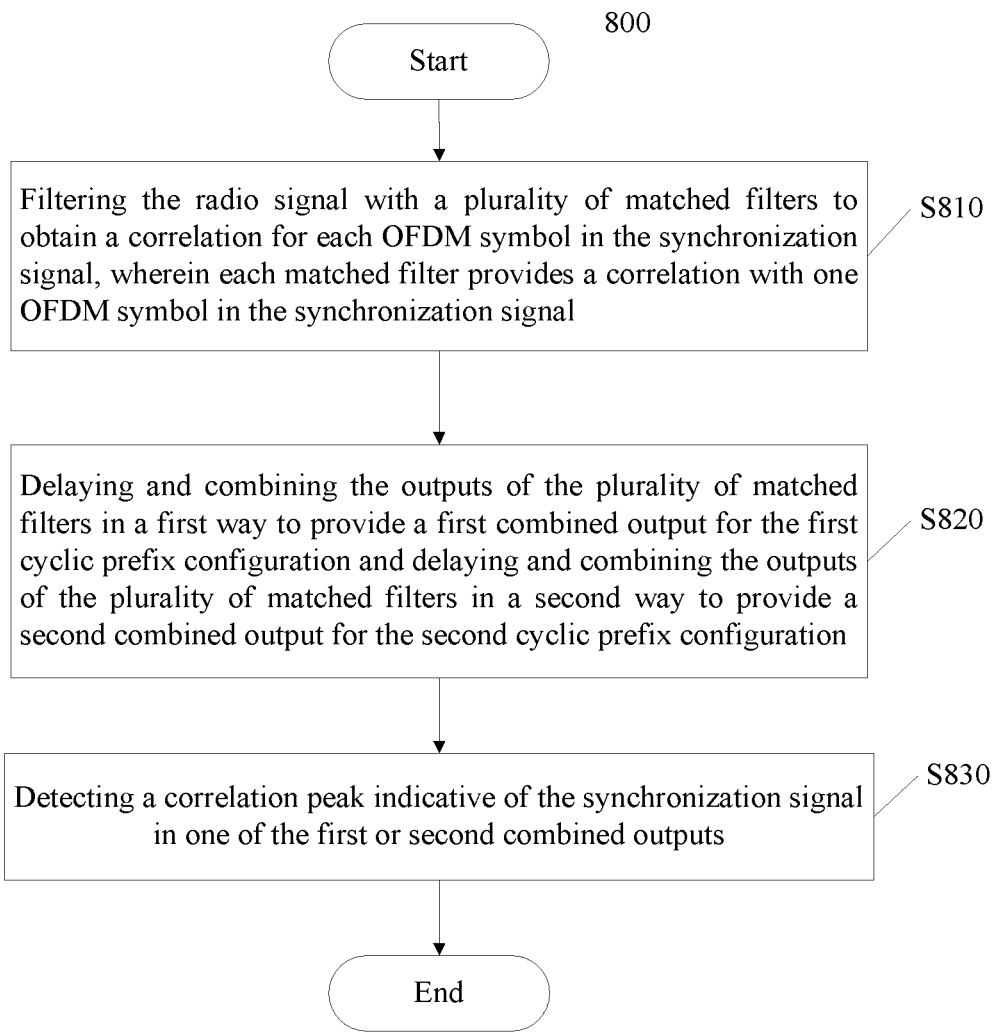
FIG. 8 is a flowchart showing a method 800 of detecting a synchronization signal including a number of OFDM symbols included in a sequence of OFDM symbols in a received radio signal according to an embodiment of the present disclosure.

FIG. 8 is a flowchart showing a method 800 of detecting a synchronization signal including a number of OFDM symbols included in a sequence of OFDM symbols in a received radio signal according to an embodiment of the present disclosure, wherein the OFDM symbols may have a first cyclic prefix configuration or a second cyclic prefix configuration.

Referring to FIG. 8, the method 800 may include: filtering the radio signal with a plurality of matched filters in order to obtain a correlation for each OFDM symbol in the synchronization signal, wherein each matched filter provides a correlation with one OFDM symbol in the synchronization signal (step S810); delaying and combining the outputs of the plurality of matched filters in a first way to provide a first combined output for the first cyclic prefix configuration and delaying and combining the outputs of the plurality of matched filters in a second way to provide a second combined output for the second cyclic prefix configuration (step S820); and detecting a correlation peak indicative of the synchronization signal in one of the first or second combined outputs (step S830)

As an example, each of the plurality of matched filters may have the same length as one OFDM symbol. Alternatively, each of the plurality of matched filters may have a length larger than one OFDM symbol but less than or equal to one OFDM symbol plus one cyclic prefix for the cyclic prefix configuration having the shorter cyclic prefixes of the first and second cyclic prefix configurations.

Preferably, the plurality of matched filters may be frequency compensated matched filters derived for a frequency offset hypothesis, and the delaying and the method 800 may be further include modifying the phases of the outputs of the plurality of matched filters by using one or more phase factors associated with the frequency offset hypothesis to implement a continuous phase at the first and second combined outputs.

As an example, the first cyclic prefix configuration may be NCP configuration and the second cyclic prefix configuration may be ECP configuration, and the synchronization signal may be NB-PSS or NB-SSS.

As an example, at least some of the OFDM symbols carrying the synchronization signal in a subframe for NCP configuration may be used for carrying the synchronization signal in a subframe for ECP configuration. For example, in the subframe for NCP configuration, the synchronization signal may be carried by the same OFDM symbols as in the subframe for ECP configuration. For example, in the subframe for NCP configuration, the synchronization signal may be carried by the OFDM symbols in the same order as in the subframe for ECP configuration. As an example, one or more of the OFDM symbols carrying the synchronization signal in the subframe of NCP configuration is manipulated by negation or conjugation when being used to carry the synchronization signal in the subframe of ECP configuration.

As an example, the input to each of the plurality of matched filters may be provided at the same time. Alternatively, the input to each of the plurality of matched filters may be delayed individually.

As an example, the method may further include identifying which cyclic prefix configuration is being used for the received radio signal.

Figure 9:
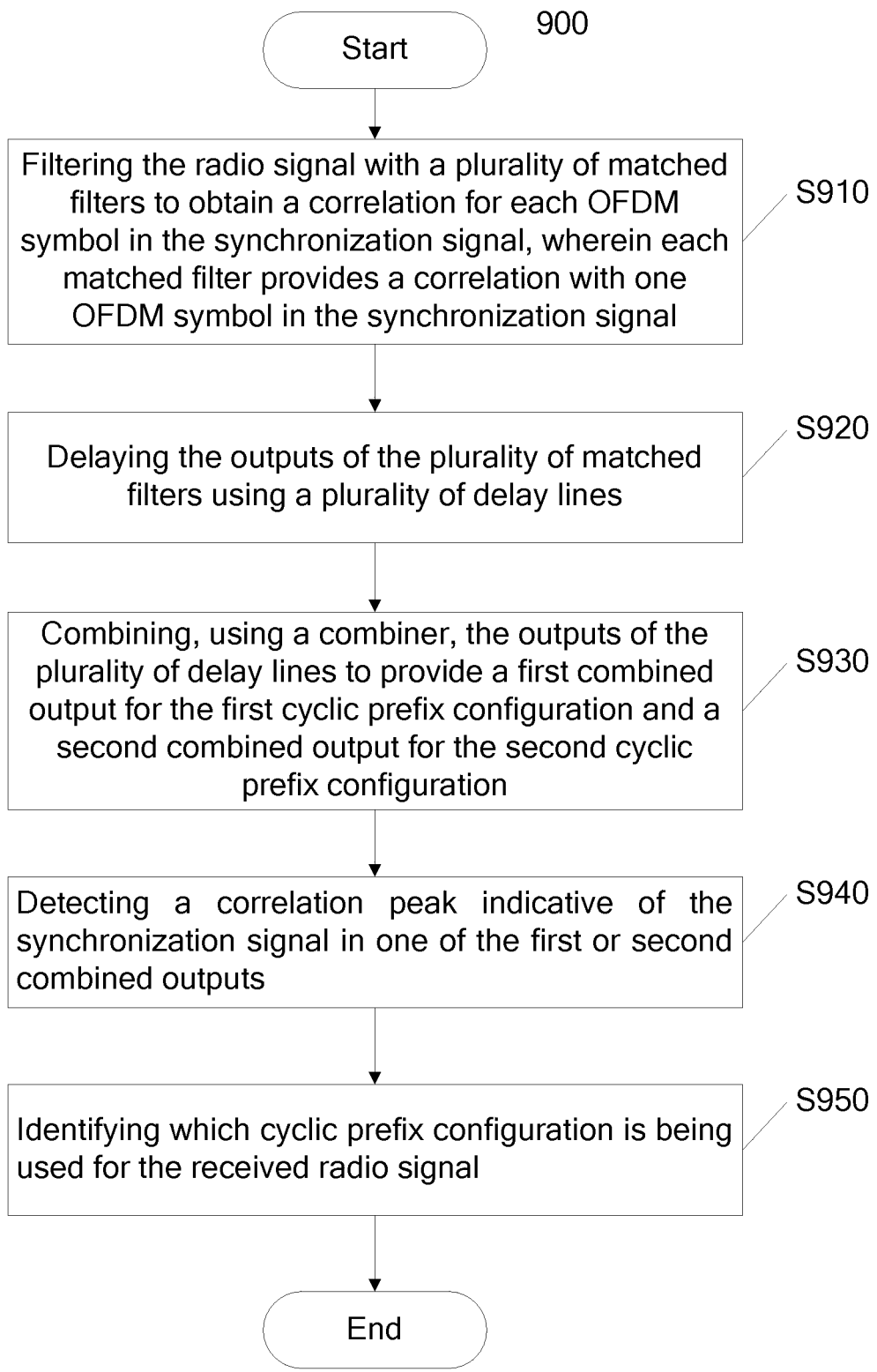
FIG. 9 is a flowchart showing a method 900 of detecting a synchronization signal including a number of OFDM symbols included in a sequence of OFDM symbols in a received radio signal according to an embodiment of the present disclosure.

FIG. 9 is a flowchart showing a method 900 of detecting a synchronization signal including a number of OFDM symbols included in a sequence of OFDM symbols in a received radio signal according to an embodiment of the present disclosure, wherein the OFDM symbols may have a first cyclic prefix configuration or a second cyclic prefix configuration.

At step S910, the radio signal may be filtered with a plurality of matched filters in order to obtain a correlation for each OFDM symbol in the synchronization signal, wherein each matched filter provides a correlation with one OFDM symbol in the synchronization signal.

As an example, the first cyclic prefix configuration may be NCP configuration and the second cyclic prefix configuration may be ECP configuration, and the synchronization signal may be NB-PSS or NB-SSS.

As an example, each of the plurality of matched filters may have the same length as one OFDM symbol. Alternatively, each of the plurality of matched filters may have a length larger than one OFDM symbol but less than or equal to one OFDM symbol plus one cyclic prefix for the cyclic prefix configuration having the shorter cyclic prefixes of the first and second cyclic prefix configurations.

As an example, the input to each of the plurality of matched filters may be provided at the same time. Alternatively, the input to each of the plurality of matched filters 401 may be delayed individually.

At step S920, the outputs of the plurality of matched filters may be delayed using a plurality of delay lines. Each delay line may be configured with first and second delay factors, which are calculated based on a mapping between a distribution of the synchronization signal in a subframe of the first cyclic prefix configuration and a distribution of the synchronization signal in a subframe of the second cyclic prefix configuration, to provide a first delayed output for the first cyclic prefix configuration and a second delayed output for the second cyclic prefix configuration respectively.

For example, each delay line may be configured based on any of the mappings as described above with reference to FIGS. 1-3. Particularly, under the mapping of FIG. 2, the delay lines may be configured according to Table 1.

At step S930, the outputs of the plurality of delay lines may be combined by a combiner to provide a first combined output for the first cyclic prefix configuration and a second combined output for the second cyclic prefix configuration.

At step S940, a correlation peak indicative of the synchronization signal may be detected in one of the first or second combined outputs.

For example, the correlation may be represented by the magnitude or magnitude-square in the output stream. The detection may be performed by looking for the largest magnitude or largest magnitude-square in the one of the first and second combined outputs according to any existing method, and adding the largest magnitude or largest magnitude-square captured over a full synchronization signal repetition period to a margin including the number of OFDM symbols spanned by a synchronization signal to generate a correlation peak indicative of the potential presence of a synchronization signal. The magnitudes or magnitude-square values may additionally be stored in random access memory or other medium to facilitate accumulation with results obtained at different synchronization signal detection attempts.

At step S950, the type of cyclic prefix configuration being used for the received radio signal may be identified.

Preferably, in case of there is a frequency offset assumption, such as a frequency offset hypothesis selected from a frequency offset grid, the plurality of matched filters may be frequency compensated matched filters derived for a frequency offset hypothesis, and the method 900 may be further include modifying the phases of the outputs of the plurality of matched filters by using one or more phase factors associated with the frequency offset hypothesis to implement a continuous phase at the first and second combined outputs. The frequency offset hypothesis may be selected from a frequency offset grid, which typically being in steps of 7.5 kHz, e.g. [ . . . , −15 kHz, −7.5 kHz, 0 Hz, 7.5 kHz, 15 kHz, . . . ]. The phase factors may be set to respective complex values having absolute value of one. In this way, a continuous phase can be achieved at both the first and second combined outputs.

Figure 10:
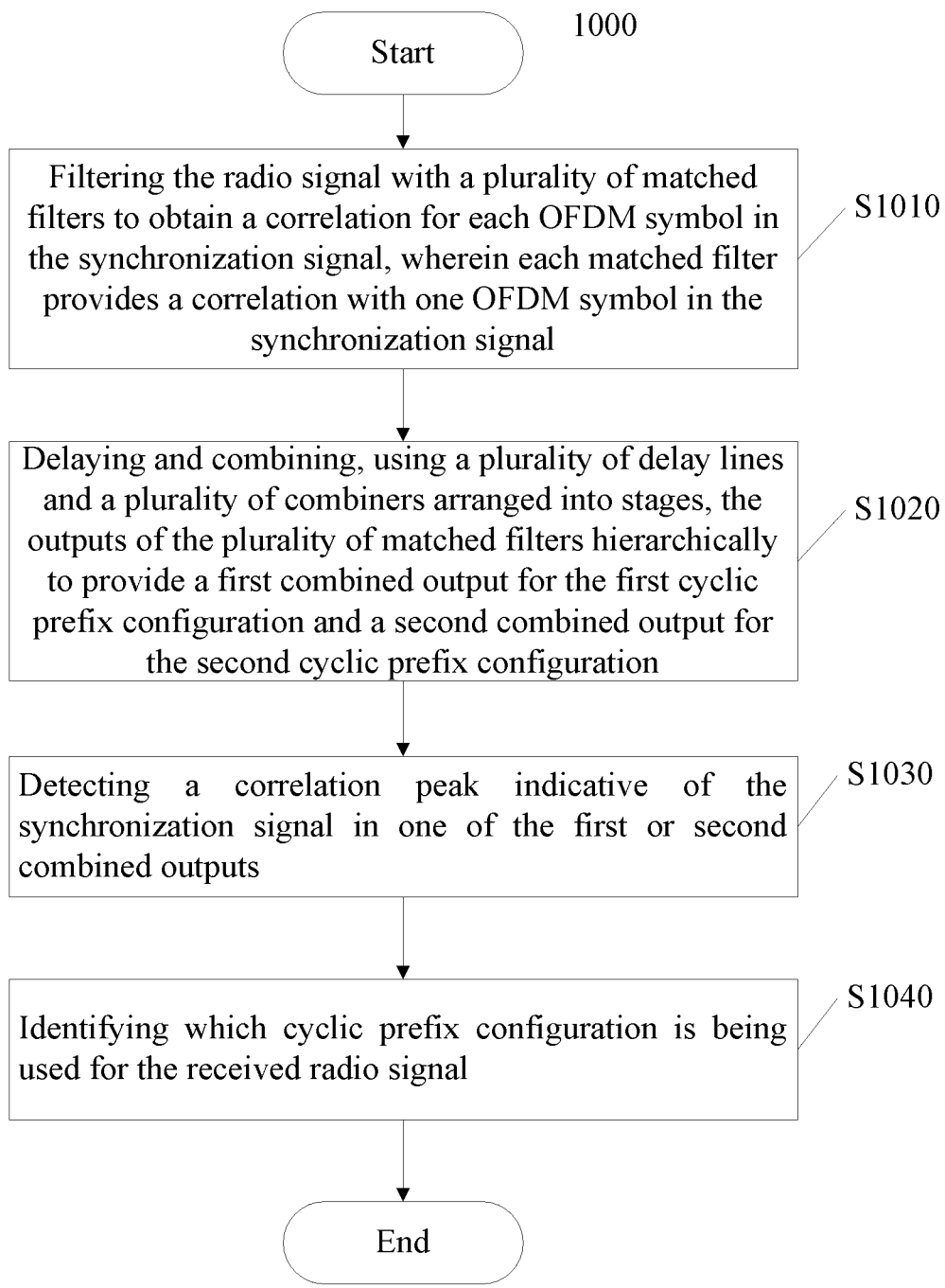
FIG. 10 is a flowchart showing a method 1000 of detecting a synchronization signal including a number of OFDM symbols included in a sequence of OFDM symbols in a received radio signal according to an embodiment of the present disclosure.

FIG. 10 is a flowchart showing a method 1000 of detecting a synchronization signal including a number of OFDM symbols included in a sequence of OFDM symbols in a received radio signal according to an embodiment of the present disclosure.

The difference between the method 1000 and the method 900 mainly resides in the step S1020. Steps S1010, S1030 and S1040 may be implemented in the same manner as steps S910, S940, and S950 respectively. For the purpose of simplicity and clarity, repeated descriptions on the same steps are omitted.

At step S1010, the radio signal may be filtered with a plurality of matched filters in order to obtain a correlation for each OFDM symbol in the synchronization signal, wherein each matched filter provides a correlation with one OFDM symbol in the synchronization signal.

At step S1020, the outputs of the plurality of matched filters may be delayed and combined hierarchically by using a plurality of delay lines and a plurality of combiners arranged into stages, to provide a first combined output for the first cyclic prefix configuration and a second combined output for the second cyclic prefix configuration.

Each delay line may be configured with first and second delay factors, which are calculated based on a mapping between a distribution of the synchronization signal in a subframe of the first cyclic prefix configuration and a distribution of the synchronization signal in a subframe of the second cyclic prefix configuration to provide a first delayed output for the first cyclic prefix configuration and a second delayed output for the second cyclic prefix configuration respectively.

For example, each delay line may be configured based on any of the mappings as described above with reference to FIGS. 1-3. Particularly, under the mapping of FIG. 2, the delay lines may be configured according to Table 2.

At step S1030, a correlation peak indicative of the synchronization signal may be detected in one of the first or second combined outputs.

At step S1040, the type of cyclic prefix configuration being used for the received radio signal may be identified.

Figure 11:
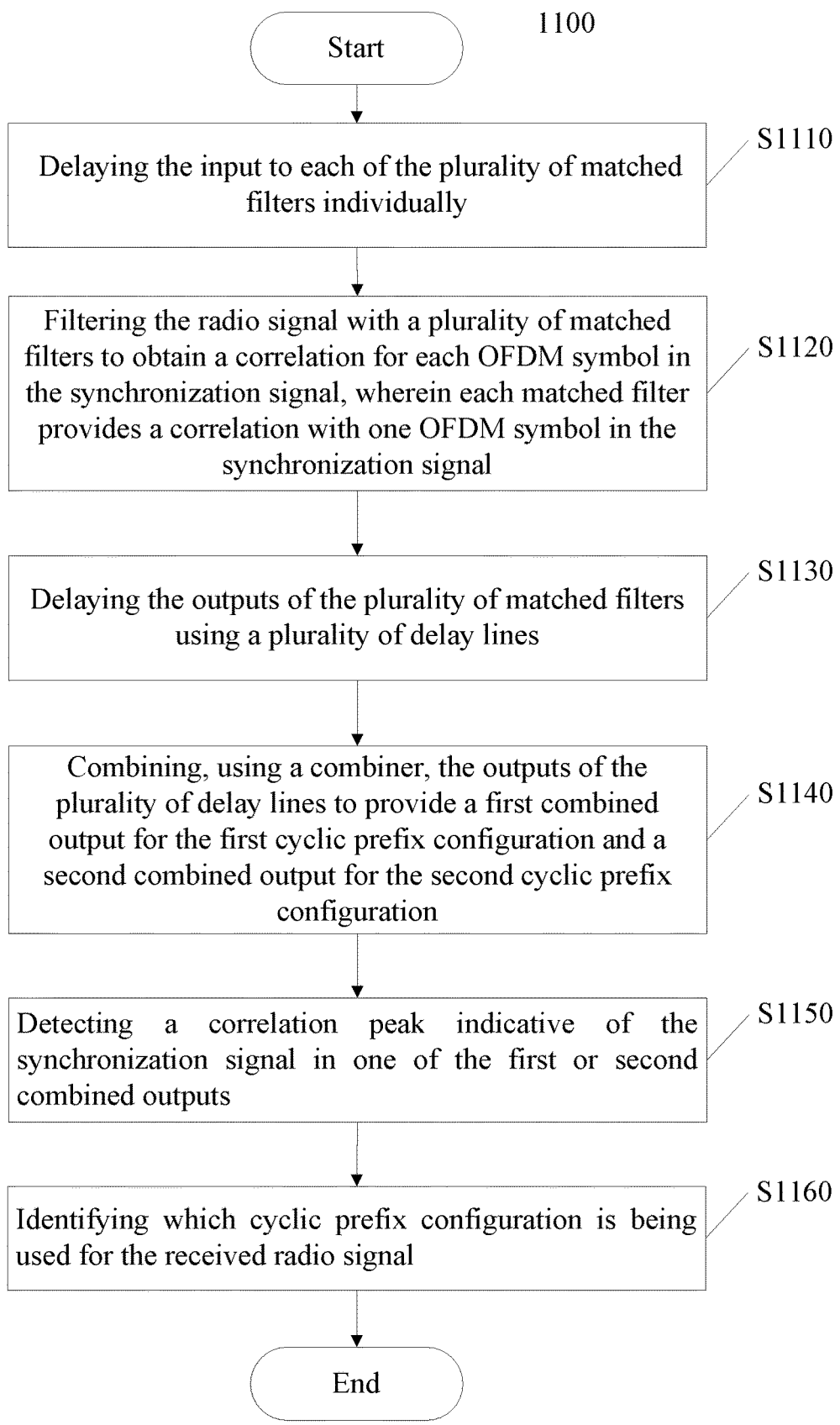
FIG. 11 is a flowchart showing a method 1100 of detecting a synchronization signal including a number of OFDM symbols included in a sequence of OFDM symbols in a received radio signal according to an embodiment of the present disclosure.

FIG. 11 is a flowchart showing a method 1100 of detecting a synchronization signal including a number of OFDM symbols included in a sequence of OFDM symbols in a received radio signal according to an embodiment of the present disclosure, wherein the OFDM symbols may have a first cyclic prefix configuration or a second cyclic prefix configuration.

The difference between the method 1100 and the method 900 mainly resides in the step S1110. Steps S1120-S1160 may be implemented in the same manner as steps S910-S950 respectively. For the purpose of simplicity and clarity, repeated descriptions on the same steps are omitted.

At step 1110, the input to each of the plurality of matched filters may be individually delayed, e.g. by using an input delay line.

In this embodiment, the least inter-synchronization signal symbol distance with respect to cyclic prefix configuration may be handled by using different delays of radio samples as input to the respective matched filters, and the difference between cyclic prefix configurations may be handled by the delay lines disposed after respective matched filters.

Taking the mapping shown in FIG. 2 as an example, the input delays and the output delays may be configured according to Table 3. It should be appreciated that the configuration of the input and output delays may vary depending on the mapping between the distributions of the synchronization signal for the first and second configurations.

At step S1120, the radio signal may be filtered with a plurality of matched filters in order to obtain a correlation for each OFDM symbol in the synchronization signal, wherein each matched filter provides a correlation with one OFDM symbol in the synchronization signal.

At step S1130, the outputs of the plurality of matched filters may be delayed using a plurality of delay lines. Each delay line may be configured with first and second delay factors, which are calculated based on a mapping between a distribution of the synchronization signal in a subframe of the first cyclic prefix configuration and a distribution of the synchronization signal in a subframe of the second cyclic prefix configuration, to provide a first delayed output for the first cyclic prefix configuration and a second delayed output for the second cyclic prefix configuration respectively.

For example, each delay line may be configured based on any of the mappings as described above with reference to FIGS. 1-3. Particularly, under the mapping of FIG. 2, the delay lines may be configured according to Table 3.

At step S1400, the outputs of the plurality of delay lines may be combined by a combiner to provide a first combined output for the first cyclic prefix configuration and a second combined output for the second cyclic prefix configuration.

At step S1150, a correlation peak indicative of the synchronization signal may be detected in one of the first or second combined outputs.

At step S1160, the type of cyclic prefix configuration being used for the received radio signal may be identified.

Figure 12:
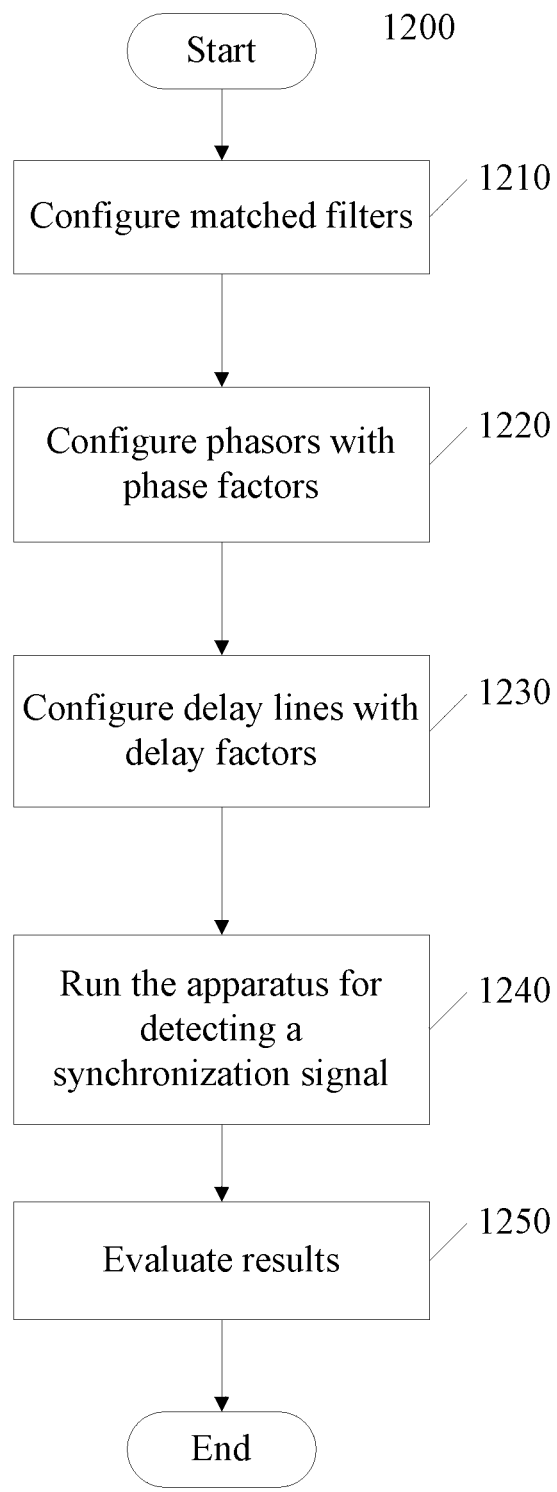
FIG. 12 is a flowchart showing a method 1200 of using the apparatus for detecting synchronization signal of the present disclosure in assumption of no frequency offset according to an embodiment of the present disclosure.

FIG. 12 is a flowchart showing a method 1200 of using the apparatus for detecting synchronization signal in assumption of no frequency offset according to an embodiment of the present disclosure.

In this embodiment, the apparatus for detecting synchronization signal may be any of the apparatus 400-700 as described above. In this embodiment, the method 1200 may be implemented in context of regular synchronization signal detection where it is assumed that the frequency offset between the nominal downlink frequency and the demodulation frequency e.g. NB-IoT demodulation frequency is centered around 0 Hz on average. For example, regular synchronization signal detection may occur when the NB-IoT is connected to or camping on a cell whereby it can maintain synchronization.

At step S1210, matched filters may be configured. In this embodiment, the matched filters are derived under assumption of 0 Hz frequency offset.

At step S1220, phasors may be configured with respective phase factors. In this embodiment, phases are all set to 1.

At step S1230, delay lines may be configured with respective delay factors. Particularly, the RSSI delay line, the input delay line, and/or output delay lines may be configured. As an example, RSSI delay line may be configured based on Tabel 1 for any of the apparatus 400-700. The delay lines for apparatus 500-700 may be configured based on Table 1, Table 2, and Table 3 respectively as described above.

At step S1240, the apparatus for detecting synchronization signal may be run. By running the apparatus, a stream of radio samples may be processed to detect candidates. Thereafter, candidate selection may also be performed.

At step S1250, the results from the apparatus may be evaluated. The resulting candidates may be evaluated after the desired number of radio samples has been processed. As an example, the method 1200 may further comprise accumulating filter outputs and RSSI from multiple synchronization signal repetition periods.

It should be appreciated that the order of performing steps S1210-1230 are not limited to the above.

Figure 13:
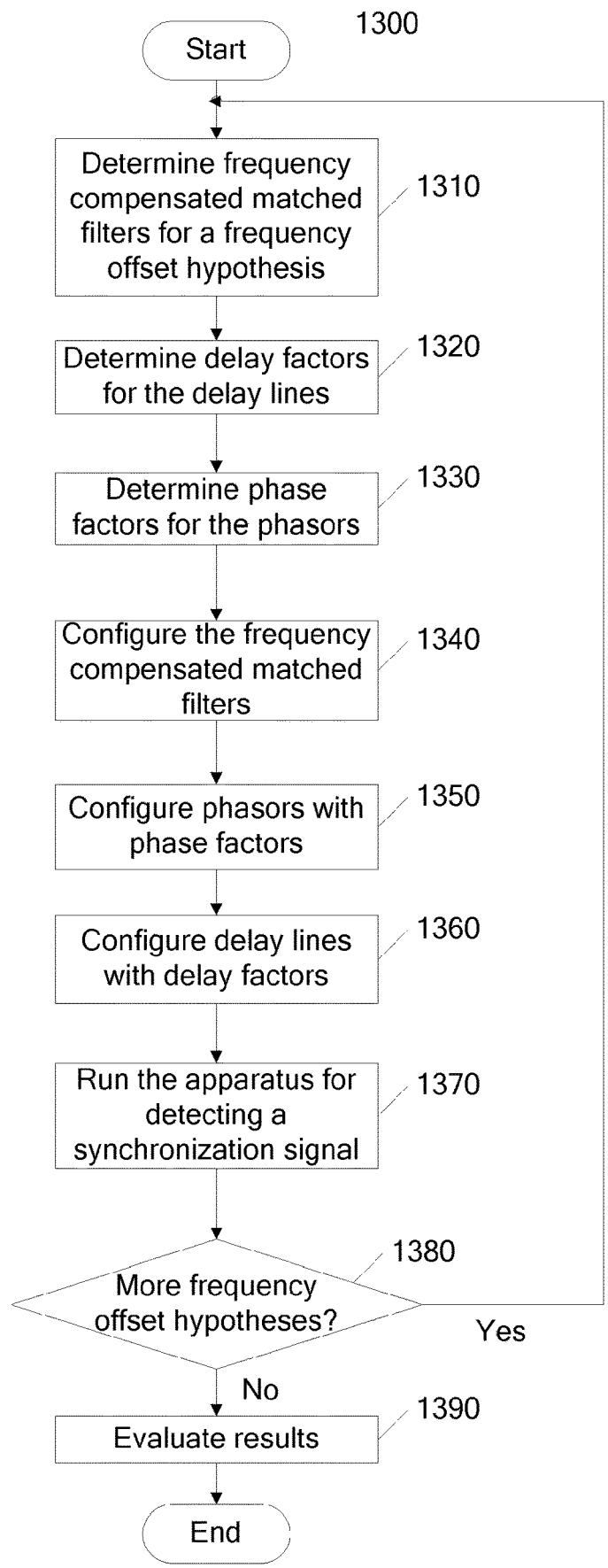
FIG. 13 is a flowchart showing a method 1300 of using the apparatus for detecting synchronization signal of the present disclosure with a frequency offset hypothesis according to an embodiment of the present disclosure.

FIG. 13 is a flowchart showing a method 1300 of using the apparatus of FIGS. 4-7 with a frequency offset hypothesis according to an embodiment of the present disclosure.

In this embodiment, the apparatus for detecting synchronization signal may be any of the apparatus 400-700 as described above. In this embodiment, the method 1300 may be implemented in context of initial synchronization signal detection where it is hypothesized that the frequency offset takes two or more values on a grid. For example, the initial synchronization signal detection may occur when initial tuning to the network before the Phase-Locked Loops (PLLs) and/or Crystal Oscillator (XO) have been tuned.

At step S1310, frequency compensated matched filter may be determined for a frequency offset hypothesis. In this embodiment, the frequency compensated matched filters may be derived based on the frequency offset hypothesis.

At step S1320, delay factors of the delay lines may be determined. As an example, delay factors of the delay lines may be determined based on Tables 1-3, as described above in step S1230. As an alternative example, depending on sampling frequency and unsynchronized frequency tolerance of e.g. the NB-IoT device (e.g. ±20 ppm), it is possible to determine the optimal delay line configurations which might differ from those in Tables 1-3, respectively.

At step S1330, phase factors of the phasors may be determined. In this embodiment, the phases that provide a continuous phase for different cyclic prefix configurations may be determined.

At step S1340, frequency compensated matched filters may be configured.

At step S1350, phasors may be configured with respective phase factors.

At step S1360, delay lines may be configured with respective delay factors.

At step S1370, the apparatus for detecting synchronization signal may be run. By running the apparatus, a stream of radio samples may be processed to detect candidates. Thereafter, candidate selection may also be performed.

At step S1380, determine if there is more frequency offset hypothesis to be considered. If there is more frequency offset hypothesis to be considered, the process proceeds to step S1310. Otherwise, the process proceeds to step S1390.

At step S1390, the results from the apparatus may be evaluated.

In this embodiment, the samples may either have been recorded and are played back for each frequency offset hypothesis, or each frequency offset hypothesis is investigated using new radio samples. The advantage with the latter is that less random access memory is needed for storage, and the advantage with the former is that less radio activity is needed. Moreover, since the radio typically is one of the largest consumers of power, the battery will last longer if recording samples. A combined or mixed approach (digital compensation of recorded data and analog compensation) may be utilized in case large frequency offsets (larger than e.g. ±15 kHz) will have to be handled, because a significant amount of the synchronization information may be lost if parts of the synchronization signal falls outside the passband of the radio filter, e.g. a Root-raised cosine (RRC) filter.

The embodiments of the present disclosure at least lead to the following benefits and advantages:

Providing a solution to detect a synchronization signal including a number of OFDM symbols included in a sequence of OFDM symbols which may have different cyclic prefix configurations;

Reducing the computational complexity by up to 50% as compared to a legacy approach (time domain filtering over the whole PSS), and thus allowing a hardware, such as a hardware accelerator (HWA), digital signal processor (DSP), and/or central processing unit (CPU) etc., to operate at a lower clock frequency;

Can be easily adapted to later different specification proposal by changing the configuration of matched filters and delay lines; and Reducing the storage requirements and enabling a long battery operation time.

Figure 14:
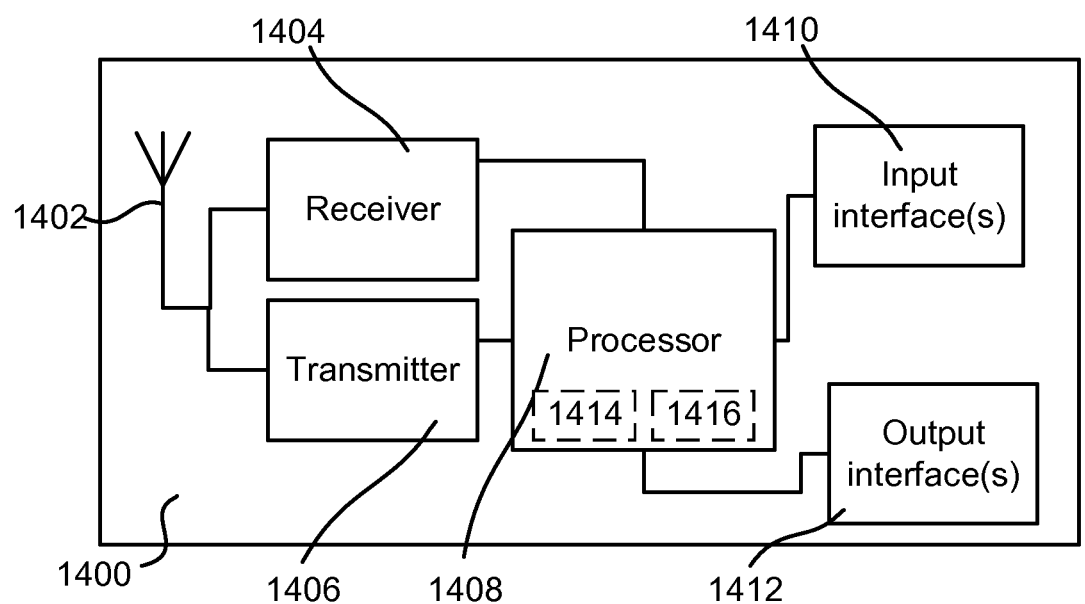
FIG. 14 is a block diagram of a wireless communication device.

FIG. 14 is a block diagram schematically illustrating a wireless device 1400, e.g. a UE such as a NB-IoT device, according to an embodiment. The wireless device 1400 comprises an antenna arrangement 1402, a receiver 1404 connected to the antenna arrangement 1402, a transmitter 1406 connected to the antenna arrangement 1402, a processing element 1408 which may comprise one or more circuits including memory 1414 and communication controller 1416, one or more input interfaces 1410 and one or more output interfaces 1412. The communication controller 1416 is arranged to operate with radio circuits, i.e. the receiver 1404 and the transmitter 1406, and may control the operation of the radio circuits, e.g. for the functions demonstrated with reference to any one of FIGS. 8 to 13. The interfaces 1410, 1412 can be user interfaces and/or signal interfaces, e.g. electrical or optical. The wireless device 1400 is arranged to operate in a cellular communication network as demonstrated above. In particular, by the processing element 1408 being arranged to perform the embodiments demonstrated above, the NB-IoT device 1400 is capable to detect a synchronization signal. The processing element 1408 can also fulfill a multitude of tasks, ranging from signal processing to enable reception and transmission since it is connected to the receiver 1404 and transmitter 1406, executing applications, controlling the interfaces 1410, 1412, etc.

The foregoing description gives only the embodiments of the present disclosure and is not intended to limit the present disclosure in any way. Thus, any modification, substitution, improvement or the like made within the sprit and principle of the present disclosure should be encompassed by the scope of the present disclosure.

The invention claimed is:

1. A method in a Narrow-Band Internet of Things (NB-IoT) device of detecting a synchronization signal comprising a number of OFDM symbols distributed within a sequence of OFDM symbols in a subframe of a received radio signal wherein the OFDM symbols have either a first cyclic prefix configuration or a second cyclic prefix configuration, the method
comprising:
   filtering the radio signal with a plurality of matched filters to obtain correlations for OFDM symbols which may be used in the synchronization signal, wherein each matched filter provides a correlation with one OFDM symbol which may be used in the synchronization signal;
   delaying and combining the outputs of the plurality of matched filters in a first way to provide a first combined output for the first cyclic prefix configuration, and in a second way to provide a second combined output for the second cyclic prefix configuration; and
   detecting a correlation peak indicative of the synchronization signal in one of the first or second combined outputs.

2. The method of claim 1, wherein all of the plurality of matched filters have one of the following lengths:
   the same length as one OFDM symbol; and
   a length larger than one OFDM symbol but less than or equal to one OFDM symbol plus one cyclic prefix, wherein the first and second cyclic prefix configurations include cyclic prefixes of respective first and second lengths, and wherein the one cyclic prefix has the shorter of the first and second lengths.

3. The method of claim 1, wherein:
   the delaying and combining operation comprises:
      delaying the outputs of the plurality of matched filters using a plurality of delay lines; and
      combining, using a combiner, the outputs of the plurality of delay lines to provide the first combined output for the first cyclic prefix configuration and the second combined output for the second cyclic prefix configuration;
   each delay line is configured with first and second delay factors usable to generate, respectively, a first delayed output for the first cyclic prefix configuration and a second delayed output for the second cyclic prefix configuration respectively; and
   the first and second delay factors are calculated based on a mapping between the distribution of the synchronization signal in a subframe of the first cyclic prefix configuration and the distribution of the synchronization signal in a subframe of the second cyclic prefix configuration.

4. The method of claim 1, wherein:
   the delaying and combining operation comprises delaying and combining, using a plurality of delay lines and a plurality of combiners arranged into stages, the outputs of the plurality of matched filters hierarchically to provide the first combined output for the first cyclic prefix configuration and the second combined output for the second cyclic prefix configuration;

each delay line is configured with first and second delay factors usable to generate, respectively, a first delayed output for the first cyclic prefix configuration and a second delayed output for the second cyclic prefix configuration respectively; and the first and second delay factors are calculated based on a mapping between the distribution of the synchronization signal in a subframe of the first cyclic prefix configuration and the distribution of the synchronization signal in a subframe of the second cyclic prefix configuration.

5. The method of claim 1, wherein:
the plurality of matched filters are frequency compensated according to a frequency offset hypothesis; and
the method further comprises modifying the phases of the outputs of the plurality of matched filters by using one or more phase factors associated with the frequency offset hypothesis to implement a continuous phase at the first and second combined outputs.

6. The method of claim 1, wherein:
the first cyclic prefix configuration is a normal cyclic prefix (NCP) configuration;
the second cyclic prefix configuration is an extended cyclic prefix (ECP) configuration; and
the synchronization signal is one of a Narrow-Band Primary Synchronization Signal (NB-PSS) and a Narrow-Band Secondary Synchronization Signal (NB-SSS).

7. The method of claim 6, wherein at least some of the OFDM symbols carrying the synchronization signal in a subframe for the NCP configuration are used for carrying the synchronization signal in a subframe for the ECP configuration.

8. The method of claim 7, wherein in the subframe for the NCP configuration, the synchronization signal is carried by the same OFDM symbols as in the subframe for the ECP configuration.

9. The method of claim 8, wherein in the subframe for the NCP configuration, the synchronization signal is carried by the OFDM symbols in the same order as in the subframe for the ECP configuration.

10. The method of claim 7, wherein one or more of the OFDM symbols used to carry the synchronization signal in the subframe for the NCP configuration are a negation or a conjugation of corresponding OFDM symbols used to carry the synchronization signal in the subframe for the ECP configuration.

11. The method of claim 1 wherein respective inputs to the plurality of matched filters are provided at the same time.

12. The method of claim 1 wherein respective inputs to the plurality of matched filters are individually delayed.

13. The method of claim 1 further comprising identifying which cyclic prefix configuration is being used for the received radio signal.

14. An apparatus in a Narrow-Band Internet of Things (NB-IoT) device for detecting a synchronization signal comprising a number of OFDM symbols distributed within a sequence of OFDM symbols in a subframe of a received radio signal wherein the OFDM symbols have either a first cyclic prefix configuration or a second cyclic prefix configuration, the apparatus comprising:
a plurality of matched filters configured to filter the radio signal to obtain correlations for OFDM symbols which may be used in the synchronization signal, wherein each matched filter provides a correlation with one OFDM symbol which may be used in the synchronization signal; and a delaying and combining circuit configured to delay and combine the outputs of the plurality of matched filters in a first way to provide a first combined output for the first cyclic prefix configuration, and in a second way to provide a second combined output for the second cyclic prefix configuration; and
a peak detector configured to detect a correlation peak indicative of the synchronization signal in one of the first or second combined outputs.

15. The apparatus of claim 14, wherein all of the plurality of matched filters have one of the following lengths:
the same length as one OFDM symbol; and
a length larger than one OFDM symbol but less than or equal to one OFDM symbol plus one cyclic prefix, wherein the first and second cyclic prefix configurations include cyclic prefixes of respective first and second lengths, and wherein the one cyclic prefix has the shorter of the first and second lengths.

16. The apparatus of claim 14, wherein:
the delaying and combining circuit comprises:
a plurality of delay lines configured to delay the outputs of the plurality of matched filters; and
a combiner configured to combine the outputs of the plurality of delay lines to provide the first combined output for the first cyclic prefix configuration and the second combined output for the second cyclic prefix configuration;
each delay line is configured with first and second delay factors usable to generate, respectively, a first delayed output for the first cyclic prefix configuration and a second delayed output for the second cyclic prefix configuration respectively; and
the first and second delay factors are calculated based on a mapping between the distribution of the synchronization signal in a subframe of the first cyclic prefix configuration and the distribution of the synchronization signal in a subframe of the second cyclic prefix configuration.

17. The apparatus of claim 14, wherein:
the delaying and combining circuit comprises a plurality of delay lines and a plurality of combiners arranged into stages and configured to delay and combine the outputs of the plurality of matched filters hierarchically to provide the first combined output for the first cyclic prefix configuration and the second combined output for the second cyclic prefix configuration;
each delay line is configured with first and second delay factors usable to generate, respectively, a first delayed output for the first cyclic prefix configuration and a second delayed output for the second cyclic prefix configuration respectively; and
the first and second delay factors are calculated based on a mapping between the distribution of the synchronization signal in a subframe of the first cyclic prefix configuration and the distribution of the synchronization signal in a subframe of the second cyclic prefix configuration.

18. The apparatus of claim 14, wherein:
the plurality of matched filters are frequency compensated according to a frequency offset hypothesis; and
the delaying and combining circuit is further configured to modify the phases of the outputs of the plurality of matched filters by using one or more phase factors associated with the frequency offset hypothesis to implement a continuous phase at the first and second combined outputs.

19. The apparatus of claim 14, wherein:
the first cyclic prefix configuration is a normal cyclic prefix (NCP) configuration;
the second cyclic prefix configuration is an extended cyclic prefix (ECP) configuration; and
the synchronization signal is one of a Narrow-Band Primary Synchronization Signal (NB-PSS) and a Narrow-Band Secondary Synchronization Signal (NB-SSS).

20. The apparatus of claim 19, wherein at least some of the OFDM symbols carrying the synchronization signal in a subframe for the NCP configuration are used for carrying the synchronization signal in a subframe for the ECP configuration.

21. The apparatus of claim 20, wherein in the subframe for the NCP configuration, the synchronization signal is carried by the same OFDM symbols as in the subframe for ECP the configuration.

22. The apparatus of claim 21, wherein in the subframe for the NCP configuration, the synchronization signal is carried by the OFDM symbols in the same order as in the subframe for the ECP configuration.

23. The apparatus of claim 20, wherein one or more of the OFDM symbols carrying the synchronization signal in the subframe for the NCP configuration are a negation or a conjugation of corresponding OFDM symbols used to carry the synchronization signal in the subframe for the ECP configuration.

24. The apparatus of claim 14 wherein respective inputs to the plurality of matched filters are provided at the same time.

25. The apparatus of claim 14, further comprising an input delaying circuit configured to delay respective inputs to the plurality of matched filters individually.

26. The apparatus of claim 14, wherein the peak detector is further configured to identify which cyclic prefix configuration is being used for the received radio signal.

* * * * *